United States Patent
Venkatasubramaniam et al.

(10) Patent No.: US 11,887,172 B2
(45) Date of Patent: Jan. 30, 2024

(54) METHODS AND APPARATUS FOR ELECTRONIC DETECTION OF FRAUDULENT TRANSACTIONS USING MACHINE LEARNING PROCESSES

(71) Applicant: Walmart Apollo, LLC, Bentonville, AR (US)

(72) Inventors: Gnanapriya Venkatasubramaniam, San Carlos, CA (US); Shivee Singh, Sunnyvale, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 287 days.

(21) Appl. No.: 17/466,751

(22) Filed: Sep. 3, 2021

(65) Prior Publication Data

US 2022/0245691 A1 Aug. 4, 2022

Related U.S. Application Data

(60) Provisional application No. 63/143,363, filed on Jan. 29, 2021.

(51) Int. Cl.
  *G06Q 30/00* (2023.01)
  *G06Q 30/0601* (2023.01)
  *G06N 20/00* (2019.01)

(52) U.S. Cl.
  CPC ......... *G06Q 30/0609* (2013.01); *G06N 20/00* (2019.01)

(58) Field of Classification Search
  CPC .............................................. G06Q 30/06–08
  See application file for complete search history.

(56) References Cited

U.S. PATENT DOCUMENTS 10,567,402 B1 2/2020 Comeaux et al.
10,826,889 B2 11/2020 Graham et al.
(Continued)

FOREIGN PATENT DOCUMENTS

CN 109409896 A 3/2019
CN 110175850 A 8/2019
(Continued)

OTHER PUBLICATIONS

Y. Dou et al., "Enhancing Graph Neural Network-based Fraud Detectors against Camouflaged Fraudsters," Conference on Information and Knowledge Management (CIKM '20), Oct. 19-23, 2020, Virtual Event, Ireland, 10 pages.
(Continued)

*Primary Examiner* — Ethan D Civan
(74) *Attorney, Agent, or Firm* — Morgan, Lewis & Bockius LLP; Manita Rawat

(57) ABSTRACT

This application relates to apparatus and methods for identifying fraudulent transactions. The embodiments may employ machine learning processes to detect fraudulent activity. In some examples, a computing device determines customer data and device data for a customer and device involved in a transaction. The customer data may include previous transactions by the customer, and the device data may include previous transactions involving the device. The computing device generates features based on the customer data and the device data, and applies one or more machine learning models to the generated features to generate a trust score. The trust score is indicative of how likely a transaction is to be fraudulent. In some examples, the transaction is not allowed if the trust score is beyond a threshold. In some examples, the computing device trains the machine learning models based on customer data and device data for a plurality of customers and devices.

19 Claims, 14 Drawing Sheets

(56) References Cited

U.S. PATENT DOCUMENTS

| | | |
|---|---|---|
| 10,878,388 B2 | 12/2020 | Wang et al. |
| 11,037,236 B1 | 6/2021 | Ram et al. |
| 11,049,109 B1 | 6/2021 | Kramme et al. |
| 11,159,505 B1 | 10/2021 | Lester et al. |
| 11,276,023 B1 | 3/2022 | Butler et al. |
| 2013/0054438 A1* | 2/2013 | Boding ............... G06Q 20/405 705/35 |
| 2019/0378010 A1 | 12/2019 | Morris et al. |
| 2019/0378050 A1 | 12/2019 | Edkin et al. |
| 2020/0126085 A1* | 4/2020 | Roche ................ G06Q 20/102 |
| 2020/0134628 A1 | 4/2020 | Jia et al. |
| 2020/0167786 A1 | 5/2020 | Kursun |
| 2020/0167798 A1 | 5/2020 | Lee et al. |
| 2020/0242669 A1 | 7/2020 | Carroll et al. |
| 2020/0311734 A1 | 10/2020 | Mardikar et al. |
| 2020/0364676 A1 | 11/2020 | Manmohan et al. |
| 2021/0103574 A1 | 4/2021 | Belezko et al. |
| 2021/0160247 A1 | 5/2021 | Gaddam et al. |
| 2021/0174366 A1 | 6/2021 | Zeng et al. |
| 2021/0334822 A1 | 10/2021 | Pati et al. |
| 2021/0374754 A1 | 12/2021 | Pandian |

FOREIGN PATENT DOCUMENTS

| | | |
|---|---|---|
| CN | 110633987 A | 12/2019 |
| IN | 111340107 A | 6/2020 |
| WO | 2020/040710 A2 | 2/2020 |
| WO | 2020/097277 A1 | 5/2020 |

OTHER PUBLICATIONS

A. Dal Pozzolo, et al., "Credit Card Fraud Detection: A Realistic Modeling and a Novel Learning Strategy," IEEE, Sep. 14, 2017, 14 pages.

Y. Labrou, et al., "Wireless Wallet," IEEE, Aug. 26, 2004, 10 pages.

Baruhupolage Kasun Perera, "A Class Imbalance Learning Approach to Fraud Detection in Online Advertising," A Thesis Presented to the Masdar Institute of Science and Technology in Partial Fulfillment of the Requirements for the Degree of Master of Science in Computing and Information Science, 2013, 95 pages.

Nikita Shirodkar, et al., "Credit Card Fraud Detection Techniques—A Survey," 2020 International Conference on Emerging Trends in Information Technology and Engineering, IEEE, 2020, pp. 1-7.

C. Merz, "Classification and Regression by Combining Models," ProQuest Dissertations Publishing, 1998, 232 pages.

J. Mendes-Moreira et al., "Ensemble Approaches for Regression: A Survey," ACM Computing Surveys, vol. 45, No. 1, Article 10, Nov. 2012, 40 pages.

* cited by examiner

METHODS AND APPARATUS FOR ELECTRONIC DETECTION OF FRAUDULENT TRANSACTIONS USING MACHINE LEARNING PROCESSES

CROSS-REFERENCE TO RELATED APPLICATIONS

This application claims priority to U.S. Provisional Patent Application No. 63/143,363, filed on Jan. 29, 2021 and entitled "METHODS AND APPARATUS FOR ELECTRONIC DETECTION OF FRAUDULENT TRANSACTIONS USING MACHINE LEARNING PROCESSES," which is hereby incorporated by reference in its entirety.

TECHNICAL FIELD

The disclosure relates generally to machine learning processes and, more specifically, to electronically identifying fraudulent transactions using machine learning processes.

BACKGROUND

Some transactions, such as some in-store or online retail transactions, are fraudulent. For example, a fraudster may attempt to purchase an item using a payment form, such as a credit card, belonging to another person. The fraudster may have stolen or found the payment form, and may attempt to use the payment form for the purchase without permission from the payment form's rightful owner. In some cases, such as with in-store purchases, a fraudster may present another's identification (ID) card (e.g., driver's license), in addition to the payment form, when attempting to purchase the item, thereby facilitating the in-store fraudulent purchase.

Online retail purchases may also be fraudulent. For example, customers often access a retailer's website from a computer or mobile device, such as a cellphone. In some examples, the computer or mobile device may store personal information for the customer, such as contact information and payment forms (e.g., saved credit card information, digital wallets, etc.). The customer may use the payment forms to purchase items on the website. If a fraudster gains access to the customer's computer or mobile device, the fraudster may be able to purchase items on the website using the customer's payment forms. Thus, online purchase conveniences may facilitate fraudulent online retail transactions.

In each of these examples, the fraudster is involved in a fraudulent activity. Fraudulent activities may cause victimized persons time and, in some examples, financial losses. For example, a victimized person may need to contact a financial institution and/or retailer to be credited for a fraudulent activity. In some examples, the victimized person may not be able to recover the financial losses. Fraudulent activities may also cause financial harm to a company, such as a retailer. For example, the true owner of the payment form may identify the fraudulent transaction and have the transaction cancelled. As such, the retailer may not receive payment for the purchased items. Thus, customers and retailers may benefit from the identification of fraudulent transactions before those transactions are completed.

SUMMARY

The embodiments described herein are directed to automatically identifying fraudulent transactions through various purchase channels, such as for in-store and online purchases. The embodiments may employ machine learning processes to detect fraudulent activity, such as when a fraudulent transaction is taking place. The machine learning processes may operate on customer information and device information (e.g., the device being used to make a purchase) involved in a transaction to generate a trust score. Based on the trust score, the embodiments may determine the transaction to be fraudulent. For example, the embodiments may detect a fraudulent in-store or online purchase. If detected fraudulent, a retailer may disallow the transaction from completing. In some examples, if a transaction is detected as fraudulent, the suspected fraudster may be prompted or asked to provide additional information, such as identification information, payment form information, or any other suitable information to verify that the transaction would be valid (e.g., lawful). As such, the embodiments may allow a retailer to stop or prevent a transaction determined to be fraudulent. In addition the embodiments may allow a retailer to decrease expenses related to fraudulent transactions. The embodiments may also allow customers to avoid being defrauded.

In accordance with various embodiments, exemplary systems may be implemented in any suitable hardware or hardware and software, such as in one or more suitable computing devices. For example, in some embodiments, a computing device (e.g., server) receives purchase data identifying a purchase attempt (e.g., a current purchase attempt, such as at a store or on a website) by a customer using a device (e.g., smartphone). The computing device determines a customer associated with the device, and obtains customer data (e.g., historical purchases made by the customer) for the customer. In some examples, the computing device further obtains device data (e.g., historical purchases made with the device) for the device.

The computing device then generates features based on the customer data and/or device data. In some examples, the computing device generates node data identifying links between customer-device nodes based on the customer data and the device data. The computing device then applies a trained relational-graph convolutional network (R-GCN) to the generated features and the node data to generate a trust score.

In some examples, the computing device determines a segment of a customer segmentation model for the customer based on, for example, the customer data, and determines one or more machine learning models based on the segment. Each of the plurality of segments may define a customer category. Further, the computing device applies the one or more machine learning models to the generated features to generate a first score. The machine learning models may include, for example, a Gradient Boosting Machine (GBM) model, a decision tree model, a non-linear model (e.g., non-linear classifier), and a linear model (e.g., linear classifier). The computing device applies one or more algorithms (e.g., rule-based algorithms) to the customer data and/or device data to generate a second score. The computing device generates the trust score based on the first score and the second score.

In some examples, the computing device generates first features based on the customer data, and generates second features based on the device data. The computing device applies a first supervised learning model, such as decision tree model (e.g., XGBoost model, Random Forest model), to first features to generate a customer score, and further applies a second supervised learning model to the second features to generate a device score. The computing device then applies a statistical model, such as a Bayesian model, to the customer score and the device score (and, in some examples, to additional generated features) to generate the trust score. The trust score can be indicative of whether a transaction being conducted by a customer using the corresponding device is to be trusted or not.

In some examples, the trust score is a binary value, where one value (e.g., 1) indicates that the transaction is fraudulent, and another value (e.g., 0) indicates that the transaction is not fraudulent. In some examples, the trust score is a probability score, such as a value between 0 and 1, inclusive. In some examples, the computing device compares the trust score to a threshold value to determine an action to be taken for the transaction (e.g., allow, or disallow, the transaction). For example, the computing device can determine not to allow the transaction if the trust score is at or above the threshold value, and allow the transaction if the trust score is below the threshold value. Further, in some examples, the computing device can transmit data indicating whether the transaction is fraudulent. For example, the computing device can transmit the trust score to another computing device (e.g., server). The computing device receiving the trust score can determine whether the transaction is fraudulent based on the trust score (e.g., by comparing to a threshold value, by applying another model, such as a machine learning model, to the trust score to, etc.).

In some embodiments, a computing device configured to receive purchase data identifying a customer and a first device. The computing device is also configured to obtain customer data for the customer, and obtain device data for the device. The computing device is further configured to determine a segment for the customer based on the customer data. The computing device is also configured to determine a machine learning model based on the segment. Further, the computing device is configured to generate features for the machine learning model based on the customer data and the device data. The computing device is also configured to apply the machine learning model to the features to generate a first score, and apply one or more rules to the customer data to generate a second score. Further, the computing device is configured to generate a trust value based on the first score and the second score. The computing device is also configured to generate a purchase response based on the trust value. The computing device is further configured to transmit the purchase response to another computing device.

In some embodiments, a method includes receiving purchase data identifying a customer and a first device. The method also includes obtaining customer data for the customer, and obtaining device data for the device. The method further includes determining a segment for the customer based on the customer data. The method also includes determining a machine learning model based on the segment. The method further includes generating features for the machine learning model based on the customer data and the device data. The method also includes applying the machine learning model to the features to generate a first score, and applying one or more rules to the customer data to generate a second score. Further, the method includes generating a trust value based on the first score and the second score. The method also includes generating a purchase response based on the trust value. The method further includes transmitting the purchase response to another computing device.

In some embodiments, a non-transitory computer readable medium has instructions stored thereon. The instructions, when executed by at least one processor, cause a device to perform operations that include receiving purchase data identifying a customer and a first device. The operations also include obtaining customer data for the customer, and obtaining device data for the device. The operations further include determining a segment for the customer based on the customer data. The method also includes determining a machine learning model based on the segment. The operations further include generating features for the machine learning model based on the customer data and the device data. The operations also include applying the machine learning model to the features to generate a first score, and applying one or more rules to the customer data to generate a second score. Further, the operations include generating a trust value based on the first score and the second score. The operations also include generating a purchase response based on the trust value. The operations further include transmitting the purchase response to another computing device.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

Figure 1:
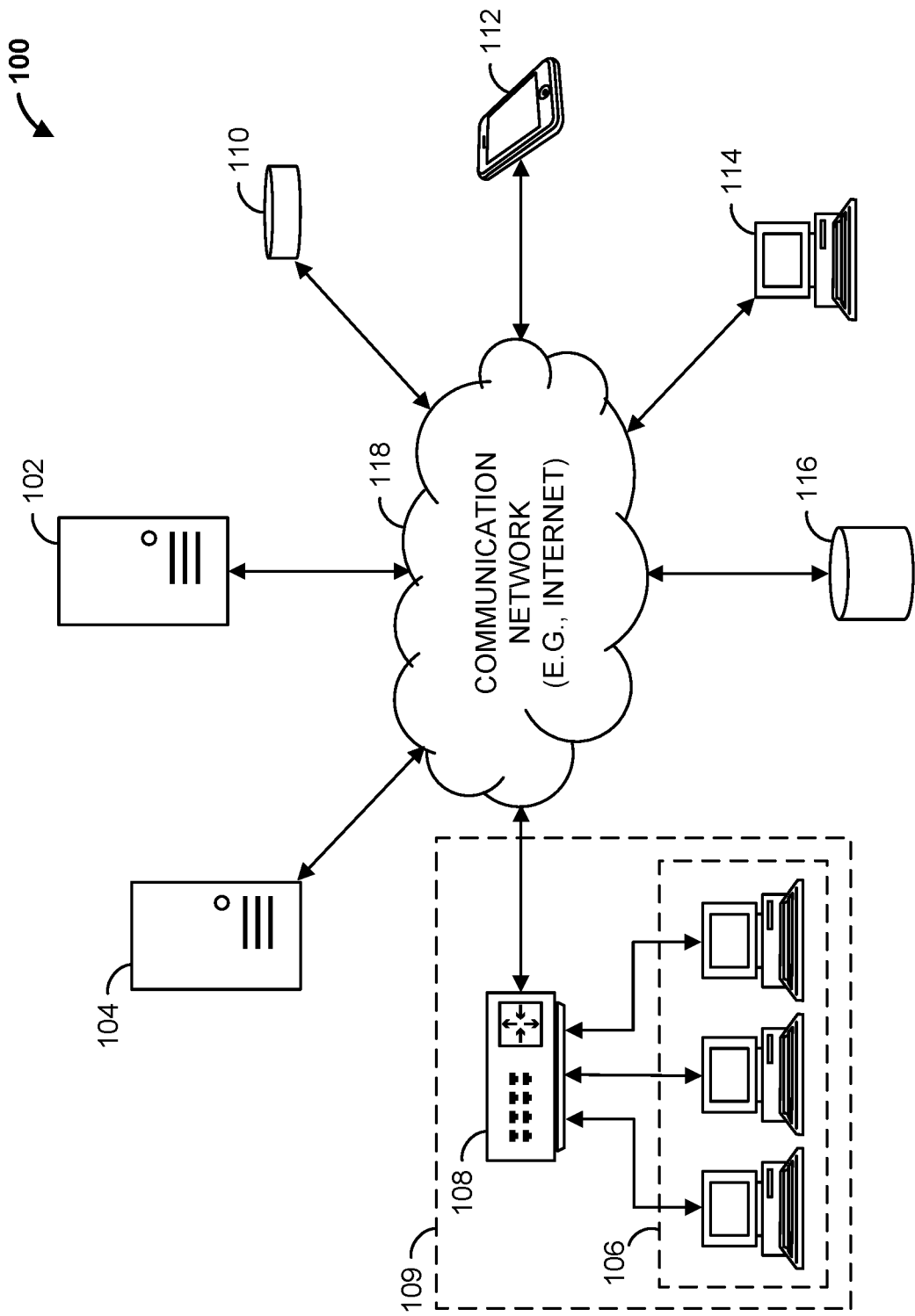
FIG. 1 is a block diagram of a fraud detection system in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

The embodiments employ machine learning processes to generate a trust score (e.g., value) for a particular customer and device pair. The trust score may be indicative of whether a transaction being conducted by the customer using the device is to be trusted. For example, in some examples, the embodiments may deny a transaction (e.g., a purchase) from completing when the trust score is below a threshold.

In some examples, features are generated based on customer data and device data. The customer data may include data identifying previous purchases by a customer, and the device data may include data identifying previous purchases made using a device. A trained relational-graph convolutional network (R-GCN) is applied to the features to generate the trust score.

In some examples, a first set of features are generated based on the customer data, and a second set of features are generated based on the device data. A first trained machine learning model, such as one based on XGBoost, is applied to first set of features to generate a customer score, and a second trained machine learning model is applied to the second set of features to generate a device score. The trust score is then determined based on the customer score and the device score. For example, a third machine learning model, such as a trained Bayesian model, is applied to the customer score and the device score to generate the trust score.

In some examples, one or more machine learning models are determined based on customer data for a customer. For example, a segment of a customer segmentation model for the customer is determined based on the customer data. The determined one or more machine learning models are applied to features generated based on the customer data and/or device data to generate a first score. The machine learning models may include, for example, a Gradient Boosting Machine (GBM) model, a decision tree model, a non-linear model (e.g., non-linear classifier), and a linear model (e.g., linear classifier). One more algorithms (e.g., rule-based algorithms) may also be applied to the customer data and/or device data to generate a second score. The trust score may then be generated based on the first score and the second score.

Turning to the drawings, FIG. 1 illustrates a block diagram of a fraud detection system 100 that includes fraud detection computing device 102 (e.g., a server, such as an application server), web server 104, workstation(s) 106, database 116, and multiple customer computing devices 110, 112, 114 operatively coupled over network 118. Fraud detection computing device 102, workstation(s) 106, web server 104, and multiple customer computing devices 110, 112, 114 can each be any suitable computing device that includes any hardware or hardware and software combination for processing and handling information. For example, each of fraud detection computing device 102, web server 104, workstations 106, and multiple customer computing devices 110, 112, 114 can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, communication network 118.

In some examples, fraud detection computing device 102 can be a computer, a workstation, a laptop, a server such as a cloud-based server, or any other suitable device. Each of multiple customer computing devices 110, 112, 114 can be a mobile device such as a cellular phone, a laptop, a computer, a table, a personal assistant device, a voice assistant device, a digital assistant, or any other suitable device.

Although FIG. 1 illustrates three customer computing devices 110, 112, 114, fraud detection system 100 can include any number of customer computing devices 110, 112, 114. Similarly, fraud detection system 100 can include any number of workstation(s) 106, fraud detection computing devices 102, web servers 104, and databases 116.

Workstation(s) 106 are operably coupled to communication network 118 via router (or switch) 108. Workstation(s) 106 and/or router 108 may be located at a store 109, for example. In some examples, workstation 106 is a register at store 109. Workstation(s) 106 can communicate with fraud detection computing device 102 over communication network 118. The workstation(s) 106 may send data to, and receive data from, fraud detection computing device 102. For example, the workstation(s) 106 may transmit data related to a transaction, such as a purchase transaction, to fraud detection computing device 102. In response, fraud detection computing device 102 may transmit an indication of whether the transaction is fraudulent. Workstation(s) 106 may also communicate with web server 104. For example, web server 104 may host one or more web pages, such as a retailer's website. Workstation(s) 106 may be operable to access and program (e.g., configure) the webpages hosted by web server 104.

Database 116 can be a remote storage device, such as a cloud-based server, a memory device on another application server, a networked computer, or any other suitable remote storage. Fraud detection computing device 102 is operable to communicate with database 116 over communication network 118. For example, fraud detection computing device 102 can store data to, and read data from, database 116. Although shown remote to fraud detection computing device 102, in some examples, database 116 can be a local storage device, such as a hard drive, a non-volatile memory, or a USB stick.

Communication network 118 can be a WiFi network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

First customer computing device 110, second customer computing device 112, and $N^{th}$ customer computing device 114 may communicate with web server 104 over communication network 118. For example, web server 104 may host one or more webpages of a website. Each of multiple computing devices 110, 112, 114 may be operable to view, access, and interact with the webpages hosted by web server 104. In some examples, web server 104 hosts a web page for a retailer that allows for the purchase of items. For example, an operator of one of multiple computing devices 110, 112, 114 may access the web page hosted by web server 104, add one or more items to an online shopping cart of the web page, and perform an online checkout of the shopping cart to purchase the items.

Fraud detection computing device 102 may determine whether a transaction is to be trusted. If the transaction is trusted (e.g., a trusted transaction), the transaction is allowed. For example, fraud detection computing device 102 may determine that an in-store or online purchase is to be trusted. Fraud detection computing device 102 may transmit a message to store 109 or web server 104, for example, indicating that the in-store or online transaction, respectively, is trusted. Store 109 or web server 104, respectively, may then allow the in-store or online transaction.

If fraud detection system 100 determines that the transaction is not trusted, the transaction may not be allowed. For example, fraud detection computing device 102 may determine that an in-store or online purchase is not to be trusted. Fraud detection computing device 102 may transmit a message to store 109 or web server 104, for example, indicating that the in-store or online transaction, respectively, is not trusted. Store 109 or web server 104, respectively, may then reject (e.g., not allow) the in-store or online transaction. In some examples, untrusted transactions may be allowed if one or more requirements are met. For example, store 109 may allow an untrusted in-store transaction if a customer shows an identification (ID), such as a driver's license or passport. Web server 104 may allow an untrusted online transaction if a customer answers security questions, or uses a different form of payment (e.g., a debit card instead of a credit card, a different credit card, etc.), for example.

In some examples, web server 104 may transmit data that identifies an attempted purchase transaction to fraud detection computing device 102. For example, web server 104 may transmit to fraud detection computing device 102 data that identifies a customer attempting to purchase items on the website. The data may further identify a device which the customer is using to make the purchase (e.g., customer computing device 110, 112, 114). In response, fraud detection computing device 102 generates a trust score, and determines whether to allow the transaction based on the trust score. Fraud detection computing device 102 then transmits to web server 104 data identifying whether the transaction is to be allowed based on the determination.

Similarly, workstation 106 may transmit to fraud detection computing device 102 data that identifies a customer attempting to purchase items at store 109. The data may further identify a device which the customer is using to make the purchase (e.g., using a digital wallet).). In response, fraud detection computing device 102 generates a trust score, and determines whether to allow the transaction based on the trust score. Fraud detection computing device 102 then transmits to workstation 106 data identifying whether the transaction is to be allowed based on the determination.

In some examples, customer computing device 110, 112, 114 transmits data identifying the scanning of items at store 109. For example, customer computing device 110, 112, 114 may execute an application that allows for the scanning of an item, such as a quick response (QR) code or bar code reader. The customer may scan each item as the item is placed into a shopping cart, for example. Upon the scanning of an item, the customer computing device 110, 112, 114 may transmit data indicating the scanning of an item to fraud detection computing device 102. In response, fraud detection computing device 102 generates a trust score, and determines whether the transaction may be fraudulent based on the trust score. Fraud detection computing device 102 then transmits to the customer computing device 110, 112, 114 data identifying whether the transaction may be fraudulent based on the determination. The application may prevent the customer from purchasing the scan items (e.g., using a digital wallet, using stored customer account information, etc.), and may initiate a communication to store 109 to have an employee of store 109 locate the customer and view the items in the cart. In some examples, if the employee determines that the purchase is not fraudulent, store 109 transmits data to the customer computing device 110, 112, 114 to allow the purchase of items at store 109 (e.g., using the digital wallet, using the stored customer account information, etc.).

Generate Trust Score Based on a Trained R-GCN Model

To generate the trust score, fraud detection computing device 102, in some example, applies a trained R-GCN model to feature data generated based on customer data for the customer and device data for the customer computing device 110, 112, 114. Customer data may include data related to previous purchases made by the customer at store 109 or a website hosted by web server 104. For example, customer data may include, for each purchase, a customer ID, a date, a payment form (e.g., credit card, debit card, digital wallet), a number of items, one or more item IDs identifying the purchased items, a price of each item, a total price paid, a store location (e.g., store address, store ID), a delivery address, and a home address. Device data may include a device ID, and data related to purchases made with the device (e.g., by any customer). For example, device data may also include, for each purchase made with the device, a customer ID, a date, a payment form, a number of items, one or more item IDs identifying the purchased items, a price of each item, a total price paid, a store location, a delivery address, and a home address.

Fraud detection computing device 102 may generate features for a customer-device pair based on corresponding customer data for that customer and device data for that device. For example, fraud detection computing device 102 may generate velocity based features such as a number of times the customer purchased items over a previous period of time (e.g., the last 10 days) and an amount of those purchases. Fraud detection computing device 102 may also generate geospatial based features, such as the location of previous purchases, or a distance from a location (e.g., home address) to each store 109 where a purchase was made. Other features may include, for example, a period of time since the customer previously purchased an item, a period of time since the customer first purchased an item, an amount of the current transaction, an average price of the current transaction, a number of items of the current transaction, an average amount of previous transactions, and an average number of items of previous transactions. In some examples, fraud detection computing device 102 trains the R-GCN model based on features generated from customer data and device data for a plurality of customers. Fraud detection computing device 102 may apply the trained R-GCN model to the features to generate the trust score.

Figure 5A:
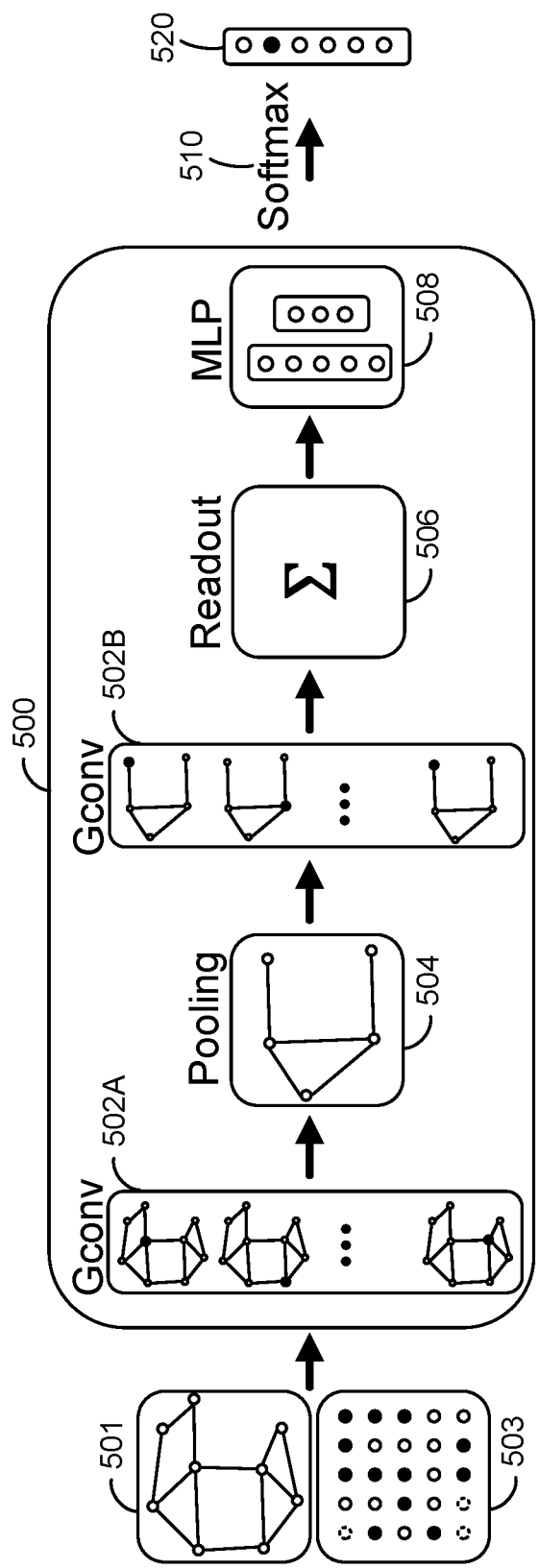
FIG. 5A illustrates a diagram of an exemplary relational-graph convolutional network in accordance with some embodiments.

For example, FIG. 5A illustrates a diagram of an R-GCN model 500 that includes convolutional layers 502A, 502B, a pooling layer 504, a readout layer 506, and an multilayer perceptron (MLP) layer 508. MLP layer 508 includes a set of fully connected feed forward neural network layers with multiple neurons in each layer. The model input includes a customer-device graph 501 and a feature matrix 503. The customer-device graph 501 may be represented as a matrix (e.g., adjacency matrix). A softmax function 510 is applied to the output of the MLP layer 508 to generate an output vector 520.

The customer-device graph 501 includes customer-device nodes that may be connected by an edge. The edges between nodes may be of varying types depending on a determined relationship between two nodes. For example, the edges may indicate a common customer between nodes, a common device between nodes, a common payment instrument (e.g., credit card) used to make purchases by each customer-device pair of the nodes, a common billing address, a common shipping address, or any other relationship between the nodes.

The below equation represents a relational GCN-hidden representation for each node at each convolutional layer 502A, 502B.

$$h_i^{l+1} = \sigma\left(W_0^{(l)} h_i^{(l)} + \sum_{r \in R} \sum_{j \in N_i^r} \frac{1}{c_{i,r}} W_r^{(l)} h_j^{(l)}\right)$$

where:
The equation represents a customer-device node (i) at layer (l+1);
$\sigma$ represents a non-linear transformation function such as ReLU;
$W_o$ is a weight (learnable parameter);
$h_i^{(l)}$ is node (i) from previous layer;
The aggregations ($\Sigma$) represents for each neighbor (j) of node (i) from the set of all Nodes (N), under each type of relationship (r), aggregate the information;
$W_r$ represents weights (learnable parameters) for each type of relationship/edge r;
$C_{i,r}$ is a normalization constant;
The first layer input $h_l$ may be set as customer-device graph 501 multiplied by feature matrix 503.

Referring back to FIG. 5A, the feature matrix 503 may include features for each customer-device node. The features may be generated based on customer data for the customer and device data for the device.

Figure 5B:
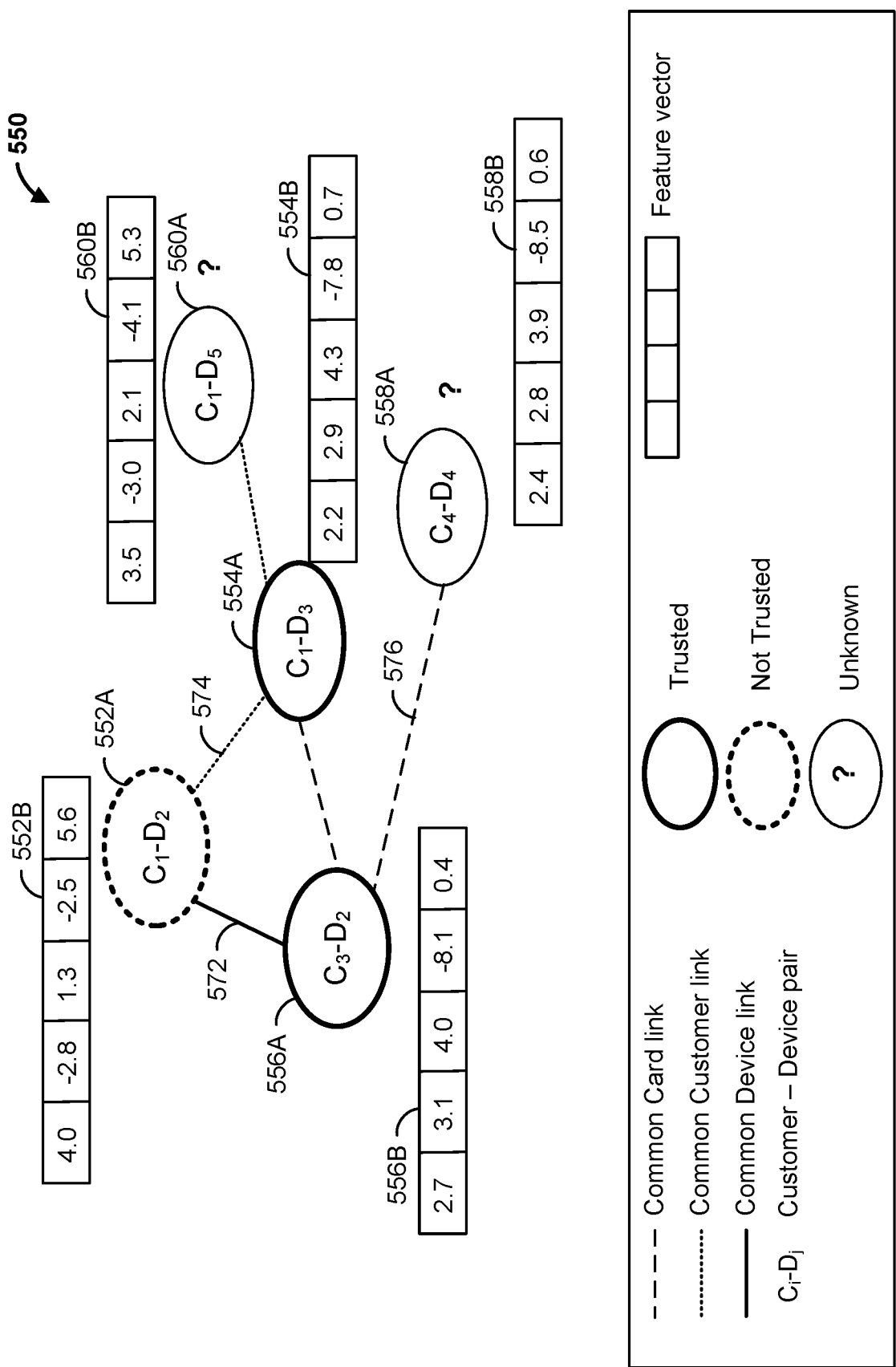
FIG. 5B illustrates a graphical representation of a customer-device node model in accordance with some embodiments.

FIG. 5B illustrates an example customer-device graph 550 that includes a plurality of customer-device nodes. Each customer-device node is associated with a customer (e.g., via a customer identification (ID) and a device (e.g., via a device ID). The device may be one with which the customer has made a previous purchase. For example, customer device node 552A represents customer C1 and device D2. Similarly, customer device node 554A also represents customer C1, but device D3. Customer device node 556A represents customer C3 and device D2, customer device node 558A represents customer C4 and device D4, and customer device node 560A represents customer C1 and device D5.

The customer-device graph 550 further indicates whether each customer-device node is trusted, not trusted, or whether not yet known. A trusted customer-device node indicates that the corresponding customer is trusted to make purchases using the corresponding device. For example, customer device node 556A is trusted, indicating that customer C3 is to be trusted to make purchases with device D2. Customer device node 552A, however, is not trusted. As such, customer C1 is not to be trusted to make purchases with device D2. Fraud detection computing device 102 may determine whether a customer-device node is to be trusted based on generating a trust score for that customer-device node, as described herein. In some examples, customer-device nodes are determined to be trusted if the customer and device pair have made a threshold number of purchases over a previous period of time. For example, customer-device nodes for customers that have used a same device to make 100 purchases over the last 5 years may be deemed to be trusted. In some examples, a customer-device node must also not be associated with any charge fraudbacks. In some examples, a user can configure customer-device nodes to be trusted or not trusted. The graph 550 also indicates that no trust determinations have been made to customer device nodes 558A and 560A.

The customer-device nodes may be connected by an edge of an edge type. In this example, the type of edge is based on whether there is a common customer between the nodes, a common device between the nodes, or a same payment account (e.g., credit card, debit card, digital wallet, etc.) was used to make purchases by the customers using the corresponding device of each node. For example, customer-device node 552A is connected to customer device node 556A by a common device edge 572, as each of customer-device node 552A and customer device node 556A are associated with the same device D2. Customer-device node 552A is connected to customer-device node 554A by common customer edge 574, as each of customer-device node 552A and customer device node 554A are associated with the same customer C1. Customer device node 556A is connected to customer device node 558A by common card edge 576, as a same payment account (e.g., credit card) was used to make purchases by each customer-device pair of those nodes.

Further, each customer-device node is associated with corresponding features as indicated by corresponding feature vectors. For example, customer-device node 552A is associated with feature vector 552B. Likewise, customer device node 554A is associated with feature vector 554B, customer device node 556A is associated with feature vector 556B, customer device node 558A is associated with feature vector 558B, and customer device node 560A is associated with feature vector 560B. The features identified by each feature vector may include features based on customer data, such as data identifying previous purchases made by the customer using any device. The feature vector may also include features based on device data for the corresponding device, such as data identifying previous purchases made using the device. Some features may be generated based on the pair of the customer and the device, such as data identifying purchases made by the customer using the device. As an example, feature matrix 503 of FIG. 5A may include feature vectors for each of a plurality of customer-device nodes, such as feature vectors 552B, 554B, 556B, 558B, 560B.

Generate Trust Score Based on Ensemble Supervised Learning Processes

Referring back to FIG. 1, in some examples, fraud detection computing device 102 determines a customer risk assessment score for a customer, and a device risk assessment score for a device, and determines the trust score for the customer and device pair based on the customer and device risk assessment scores. For example, fraud detection computing device 102 may generate customer features based on customer data for a customer, and device features based on device data for a corresponding device (e.g., the device the customer is attempting to make a purchase with). In some examples, the features are generated based on the current transaction. For example, fraud detection computing device 102 may generate features based on a transaction amount for the purchase.

Fraud detection computing device 102 may then apply a trained first machine learning model, such as one based on decision trees or gradient boosting (e.g., XGBoost), to the customer features to generate the customer risk assessment score (e.g., a value between 0 and 1, inclusive). Fraud detection computing device 102 may also apply a trained second machine learning model, such as one also based on decision trees or gradient boosting, to the device features to generate the device risk assessment score. In some examples, fraud detection computing device 102 trains the first and second machine learning models based on features generated from customer data and device data, respectively, for a plurality of customers.

Fraud detection computing device 102 may then generate the trust score based on the customer risk assessment score and the device risk assessment score. For example, fraud detection computing device 102 may generate the trust score based on applying a trained third machine learning model to the customer risk assessment score and the device risk assessment score. The trained third machine learning model may be a Bayesian model, for example. In some examples, fraud detection computing device 102 determines the trust score based on applying an algorithm the customer risk assessment score and the device risk assessment score. For example, the trust score may be the average of the customer risk assessment score and the device risk assessment score. In some examples, each of the customer risk assessment score and the device risk assessment score may be weighted. In some examples, the weights are predetermined. In some examples, the weights are determined based on applying a trained machine learning model to the customer features and device features.

Generate Trust Score Based on Customer Segmentation

In some examples, to generate the trust score, fraud detection computing device 102 determines a segment of a customer segmentation model for a customer involved in a transaction. For example, the customer segmentation model may segment customers into new customers, active customers, and dormant customers. New customers may be customers that have no associated customer data (e.g., such as a customer that has not previously purchased items from the retailer's website or store 109). Active customers may be customers that have purchased at least a threshold number of items (e.g., from either the website or any store 109) over a previous period of time (e.g., the last year). Dormant customers may be customers that have not purchased at least the threshold number of items over the previous period of time. For example, fraud detection computing device 102 may receive the data identifying the customer (e.g., from web server 104 or store 109), and obtain customer data from the customer from database 116. Fraud detection computing device 102 may determine the customer segment for the customer based on the obtained customer data.

Further, and based on the customer segment, fraud detection computing device 102 applies one or more trained machine learning models to features generated from customer data for the customer and device data for the corresponding device. For example, each customer segment may have one or more associated machine learning models that were trained with varying training sets. If the customer is a new customer, fraud detection computing device 102 may generate a first set of features, and apply a first set of machine learning models to the generated first set of features to generate a first score. If the customer is an active customer, fraud detection computing device 102 may generate a second set of features, and apply the second set of features to a second set of machine learning models to generate the first score. If the customer is a dormant customer, fraud detection computing device 102 may generate a third set of features, and apply the third set of features to a third set of machine learning models to generate the first score. The machine learning models may include, for example, a GBM model, a decision tree model, or linear or non-linear classifiers. In one example, the machine learning models for each customer segment include a nonlinear classifier, and a linear classifier (e.g., stacked nonlinear and linear classifiers). In some examples, fraud detection computing device 102 trains the machine learning models based on features generated from customer data and device data for a plurality of customers.

Fraud detection computing device 102 may also generate a second score based on the application of one or more algorithms (e.g., rule-based algorithms) to the customer data and/or device data. For example, the algorithms may apply one or more rules to the customer data to generate the second score. An example of a rule may be one that disallows the purchase of more than a number of a particular item (e.g., no more than 2 gaming consoles). Another example may be a rule that prohibits deliveries in a particular graphical region (e.g., country, zip code, etc.). Fraud detection computing device 102 may determine if the purchase would violate any one or more of the rules, and generate the second score based on the number of rules violated. In some examples, each rule is weighted. For example, the violation of one rule may be weighted differently than the violation of a second rule.

Fraud detection computing device 102 may then determine the trust score based on the first score and the second score. For example, fraud detection computing device 102 may apply one or more algorithms to the first score and the second score to determine the trust score. In some examples, if any rule is violated, then fraud detection computing device 102 generates the trust score to indicate the transaction may be fraudulent (e.g., trust score=0). Otherwise, if no rules are violated, then fraud detection computing device 102 generates the first score, and provides the first score as the trust score.

Figure 2:
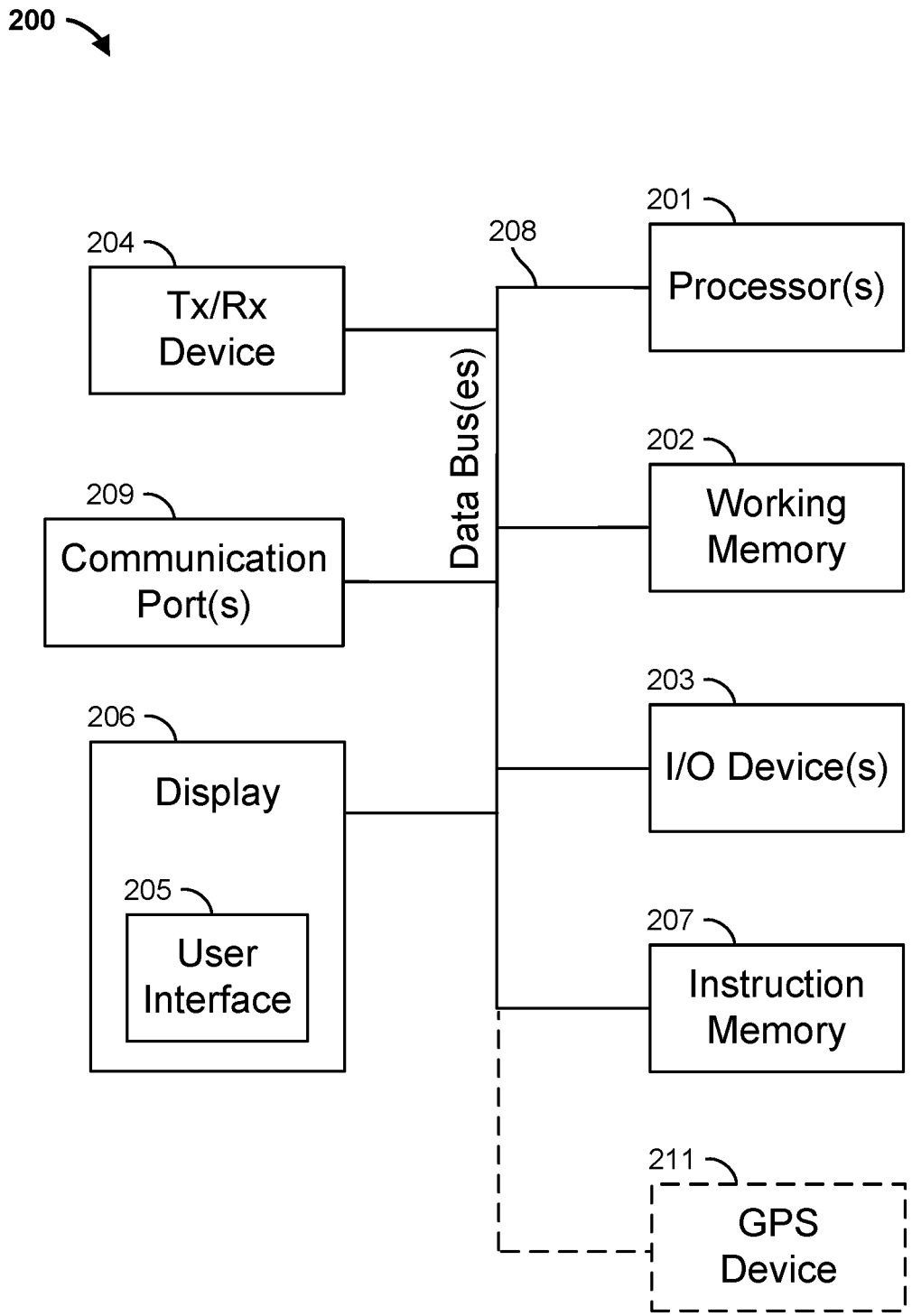
FIG. 2 is a block diagram of an exemplary computing device in accordance with some embodiments.

FIG. 2 illustrates an exemplary computing device 200, such as the fraud detection computing device 102 or customer computing devices 110, 112, 114 of FIG. 1. Computing device 200 can include one or more processors 201, working memory 202, one or more input/output devices 203, instruction memory 207, a transceiver 204, one or more communication ports 207, and a display 206, all operatively coupled to one or more data buses 208. Data buses 208 allow for communication among the various devices. Data buses 208 can include wired, or wireless, communication channels.

Processors 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processors 201 can be configured to perform a certain function or operation by executing code, stored on instruction memory 207, embodying the function or operation. For example, processors 201 can be configured to perform one or more of any function, method, or operation disclosed herein.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of fraud detection computing device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 209 can include, for example, a serial port such as a universal asynchronous receiver/transmitter (UART) connection, a Universal Serial Bus (USB) connection, or any other suitable communication port or connection. In some examples, communication port(s) 209 allows for the programming of executable instructions in instruction memory 207. In some examples, communication port(s) 209 allow for the transfer (e.g., uploading or downloading) of data, such as transaction data.

Display 206 can display user interface 205. User interfaces 205 can enable user interaction with fraud detection computing device 102. For example, user interface 205 can be a user interface for an application of a retailer that allows a customer to purchase one or more items from the retailer. In some examples, a user can interact with user interface 205 by engaging input-output devices 203. In some examples, display 206 can be a touchscreen, where user interface 205 is displayed on the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 fraud detection computing device 102 will be operating in. Processor(s) 201 is operable to receive data from, or send data to, a network, such as communication network 118 of FIG. 1, via transceiver 204.

In some examples, computing device 200 includes a global position system (GPS) device 211. GPS device 211 can determine location information, such as latitude and longitude, of computing device 200. Processor 201 may receive the location information from GPS device 211, and can display the location information within display 206. In some examples, an application executed by customer computing devices 110, 112, 114 transmits the location information to fraud detection computing device 102. Fraud detection computing device 102 may generate features based on the received location information.

Figure 3A:
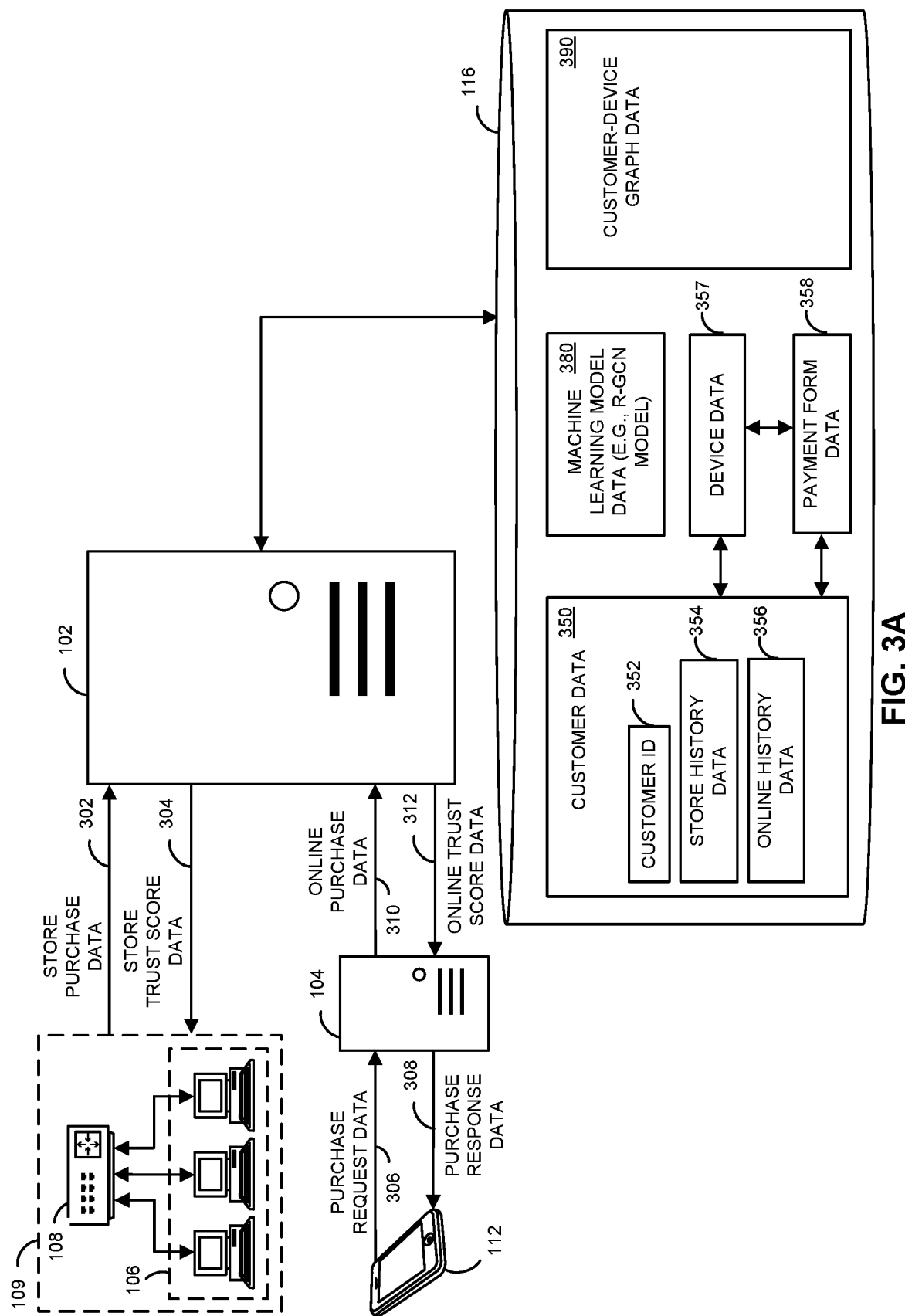
FIGS. 3A, 3B, and 3C are block diagrams illustrating examples of various portions of the fraud detection system of FIG. 1 in accordance with some embodiments.

FIG. 3A is a block diagram illustrating examples of various portions of the fraud detection system of FIG. 1. In this example, fraud detection computing device 102 can receive from a store 109 (e.g., from a computing device, such as workstation 106, at store location 109) store purchase data 302 identifying the purchase attempt of one or more items. Store purchase data 302 may include, for example, one or more of the following: an identification of one or more items being purchased; an identification of the customer (e.g., customer ID, passport ID, driver's license number, etc.); an image of an identification of the customer; an identification of a device being used for the purchase (e.g., a device ID, a user name for an application running on the device, a MAC address, etc.); a monetary amount (e.g., price) of each item being returned; the method of payment (i.e., payment form) used to purchase the items (e.g., credit card, cash, check); a Universal Product Code (UPC) number for each item; a time and/or date; and/or any other data related to the attempted purchase transaction.

Fraud detection computing device 102 may execute a machine learning process (e.g., model, algorithm) based on store purchase data 302 to generate a trust score. For example, machine learning model data 380, stored in database 116, may identify and characterize a machine learning algorithm, such as one based on R-GCN. Fraud detection computing device 102 may obtain machine learning model data 380 from database 116, and may execute the machine learning algorithm to generate a trust score for the transaction. Fraud detection computing device 102 may then generate store trust score data 304 identifying the trust score, and may transmit store trust score data 304 to store 109, for example.

To generate store trust score data 304, fraud detection computing device 102 may obtain customer-device graph data 390 from database 116. Customer-device graph data 390 may identify and characterize a customer-device graph, such as customer-device graph 550. The customer-device graph may link customer-device nodes based on one or more of common customer, common device, common payment form, or some other attribute. Further, for each customer-device node, fraud detection computing device 102 obtains corresponding customer data 350, device data 357, and payment form data 358 from database 116.

Customer data 350 may include, for example, a customer ID 352, store history data 354, and online history data 356. Store history data 354 includes data related to previous purchases at one or more stores 109, while online history data 356 includes data related to previous purchases at a retailer's website, such as one hosted by web server 104. In some examples, device data 357 is linked to purchases identified by customer data 350 that include a corresponding device. Similarly, in some examples, payment form data 358 is linked to purchases identified by customer data 350 that include a corresponding payment form.

Fraud detection computing device 102 may generate features for each customer-device node based on the corresponding customer data 350, device data 357, and payment form data 358. For example, fraud detection computing device 102 may generate feature vectors, such as feature vectors 552B, 554B, 556B, 558B, 560B, for each customer-device node based on the corresponding customer data 350, device data 357, and payment form data 358. The features may include, for example, velocity based features, geospatial based features, and other derived features, such as a period of time since the customer previously purchased an item, a period of time since the customer first purchased an item, an amount of the current transaction, an average price of the current transaction, a number of items of the current transaction, an average amount of previous transactions, and an average number of items of previous transactions.

Fraud detection computing device 102 may further generate features based on customer data 350 corresponding to the customer making the purchase. For example, fraud detection computing device 102 may identify the customer based on a customer ID identified by store purchase data 302, and obtain customer data 350 for the customer from database 116. Fraud detection computing device 102 may further obtain device data 357 for the device the customer is using to make the purchase at store 109, and payment form data 358 for the particular payment account (e.g., credit card, debit card, digital wallet, etc.) being used by the customer to make the purchase. Fraud detection computing device 102 may generate features based on the customer data 350, device data 357, and payment form data 358 obtained for the customer. Fraud detection computing device 102 may also generate features based on data included within store purchase data 302, such as a purchase amount, a date, and a store location.

Fraud detection computing device 102 applies the machine learning algorithm to the generated features to generate store trust score data 304. In some examples, fraud detection computing device 102 determines whether the transaction is to be trusted based on the generated trust score. For example, fraud detection computing device 102 may determine that the transaction is to be trusted (e.g., and thus allowed) if the generated trust score is at or above a predefined threshold. Fraud detection computing device 102 may determine that the transaction is not to be trusted (e.g., and thus not allowed) if the generated trust score is below the predefined threshold. For example, on a scale of 0 to 1, where 0 indicates no trust and 1 indicates trust, the predefined threshold may be 0.8. And trust scores at or above 0.8 are trusted, where those with trust scores below 0.8 are not trusted. Fraud detection computing device 102 may generate store trust score data 304 indicating whether the transaction should be trusted, and transmits store trust score data 304 to store 109.

Store 109 may then determine whether to allow the transaction based on store trust score data 304. For example, store 109 may compare the received trust score to a threshold. If the score is at or above the threshold, the transaction is allowed. Otherwise, if the score is below the threshold, the transaction is not allowed. In some examples, store 109 may allow the transaction if one or more requirements are met. For example, store 109 may allow the transaction if the customer provides additional information to an associate, such as a driver's license number, or uses a different form of payment.

Similarly, fraud detection computing device 102 can receive from a web server 104, such as a web server hosting a retailer's website, online purchase data 310 identifying the purchase attempt of one or more items from the website. For example, web server 104 may receive purchase request data 306 from customer computing device 112, where purchase request data 306 identifies an attempt to purchase one or more items from a website, such as a retailer's website. Web server 104 may generate online purchase data 310 based on purchase request data 306. For example, online purchase data 310 may include one or more of the following: an identification of one or more items being purchased; an identification of the customer (e.g., customer ID, a user name, a driver's license number, etc.); an identification of a device (e.g., a computer, mobile phone, etc.) being used for the purchase (e.g., a device ID, a user name for an application running on the device, a MAC address, etc.); a monetary amount (e.g., price) of each item being returned; the method of payment (i.e., payment form) used to purchase the items (e.g., credit card, cash, check); a Universal Product Code (UPC) number for each item; a time and/or date; and/or any other data related to the attempted purchase transaction.

Fraud detection computing device 102 may execute the machine learning process based on online purchase data 310 to generate a trust score. For example, as described above, fraud detection computing device 102 may obtain machine learning model data 380 from database 116, and may execute the machine learning algorithm to generate a trust score for the transaction. Fraud detection computing device 102 may then generate online trust score data 312 identifying the trust score, and may transmit store trust score data 304 to web server 104, for example. Web server 104 may determine whether to allow the transaction based on online trust score data 312. Based on the determination, web server 104 may generate purchase response data 308 indicating whether the transaction is allowed.

For example, assuming the transaction is allowed, purchase response data 308 may include information confirming the transaction, such as confirmation of the purchase, and delivery information if appropriate. If the transaction is not allowed, purchase response data 308 may include information indicating the transaction is not allowed.

In some examples, web server 104 may allow the transaction if one or more requirements are met. For example, purchase response data 308 may include a request for additional information, such as a driver's license number, or the use of a different form of payment. In some examples, the customer may complete the payment at a store, such as store 109, where the customer may be required to present a customer ID, or swipe the payment form on a card reader.

To generate the trust score, as described above, fraud detection computing device 102 may obtain customer-device graph data 390 from database 116. Further, for each customer-device node, fraud detection computing device 102 obtains corresponding customer data 350, device data 357, and payment form data 358 from database 116. Fraud detection computing device 102 may generate features for each customer-device node based on the corresponding customer data 350, device data 357, and payment form data 358. Fraud detection computing device 102 may further generate features based on customer data 350 corresponding to the customer making the purchase. For example, fraud detection computing device 102 may identify the customer based on a customer ID identified by online purchase data 310, and obtain customer data 350 for the customer from database 116. Fraud detection computing device 102 may further obtain device data 357 for the device the customer is using to make the purchase at the website, and payment form data 358 for the particular payment account (e.g., credit card, debit card, digital wallet, etc.) being used by the customer to make the purchase. Fraud detection computing device 102 may generate features based on the customer data 350, device data 357, and payment form data 358 obtained for the customer. Fraud detection computing device 102 may also generate features based on data included within online purchase data 310, such as a purchase amount and a date.

Fraud detection computing device 102 applies the machine learning algorithm to the generated features to generate online trust score data 312. In some examples, fraud detection computing device 102 determines whether the transaction is to be trusted based on the generated trust score. For example, fraud detection computing device 102 may determine that the transaction is to be trusted (e.g., and thus allowed) if the generated trust score is at or above a predefined threshold. Fraud detection computing device 102 may determine that the transaction is not to be trusted (e.g., and thus not allowed) if the generated trust score is below the predefined threshold. Fraud detection computing device 102 may generate online trust score data 312 indicating whether the transaction should be trusted, and transmits online trust score data 312 to web server 104.

Fraud detection computing device 102 may update customer data 350, device data 357, and payment form data 358 based on each completed purchase. For example, store 109 and web server 104 may transmit transaction data indicating completed transactions to fraud detection computing device 102. Fraud detection computing device 102 may then update the customer data 350, device data 357, and payment form data 358 based on the received transaction data. Fraud detection computing device 102 may also update the customer-device graph data 390 based on the received transaction data.

Figure 3B:
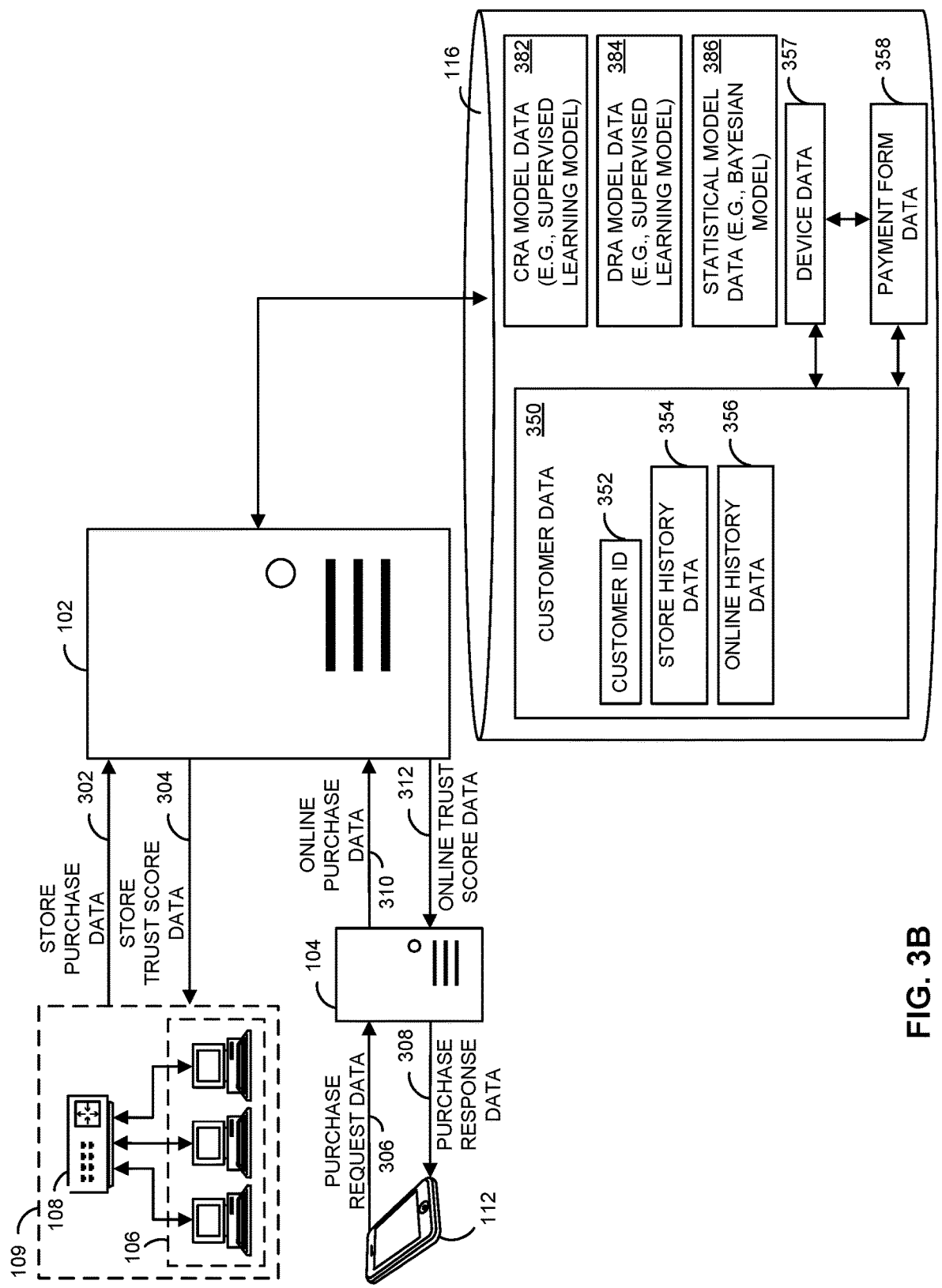

FIG. 3B is a block diagram illustrating examples of various portions of the fraud detection system of FIG. 1. In this example, database 116 stores customer risk assessment (CRA) model data 382, device risk assessment (DRA) model data 384, and statistical model data 386. Each of CRA model data 382 and DRA model data 384 may identify and characterize a machine learning model, such has an XGBoost model. CRA model data 382 characterizes a CRA model that generates a value (e.g., probability) indicative of how risky a transaction by a customer may be. DRA model data 384 characterizes a DRA model that generates a value indicative of how risky a transaction by a device may be. The CRA model may be trained, for example, based on customer data, such as customer data 350, for a plurality of customers. DRA model may be trained with device data, such as device data 357, for a plurality of devices. Statistical model data 386 identifies and characterizes a statistical model that operates on the values generated by the CRA model and the DRA model. In some examples, the statistical model may be an algorithm (e.g., formula). In some examples, the statistical model may be machine learning model, such as a Bayesian model. The machine learning model may be trained with values generated from trained CRA and DRA models.

Fraud detection computing device 102 may receive store purchase data 302 from store 109 identifying a transaction by a customer using a device. In response, fraud detection computing device 102 may obtain customer data 350 for the customer, and may generate customer features based on the obtained customer data 350. Similarly, fraud detection computing device 102 may obtain device data 357 for the device, and may generate device features based on the obtained device data 357. Fraud detection computing device 102 may apply the CRA model to the customer features to generate a customer score. Fraud detection computing device 102 may also apply the DRA model to the device features to generate a device score. Each of the customer score and the device score may be, for example, a value indicative of a probability. Fraud detection computing device 102 may then apply the statistical model to the customer score and the device score to generate the trust score.

Fraud detection computing device 102 may generate store trust score data 304 to include the trust score, and may transmit store trust score data 304 to store 109. In some examples, fraud detection computing device 102 determines whether the transaction is to be allowed based on the trust score, generates store trust score data 304 indicating whether the transaction is to be allowed, and transmits store trust score data 304 to store 109.

Similarly, fraud detection computing device 102 may receive online purchase data 310 from web server 104 identifying a transaction by a customer using a device. In response, fraud detection computing device 102 may obtain customer data 350 for the customer, and may generate customer features based on the obtained customer data 350. Similarly, fraud detection computing device 102 may obtain device data 357 for the device, and may generate device features based on the obtained device data 357. Fraud detection computing device 102 may apply the CRA model to the customer features to generate a customer score. Fraud detection computing device 102 may also apply the DRA model to the device features to generate a device score. Fraud detection computing device 102 may then apply the statistical model to the customer score and the device score to generate the trust score.

Fraud detection computing device 102 may generate online trust score data 312 to include the trust score, and may transmit online trust score data 312 to web server 104. In some examples, fraud detection computing device 102 determines whether the transaction is to be allowed based on the trust score, generates online trust score data 312 indicating whether the transaction is to be allowed, and transmits online trust score data 312 to web server 104.

Figure 3C:
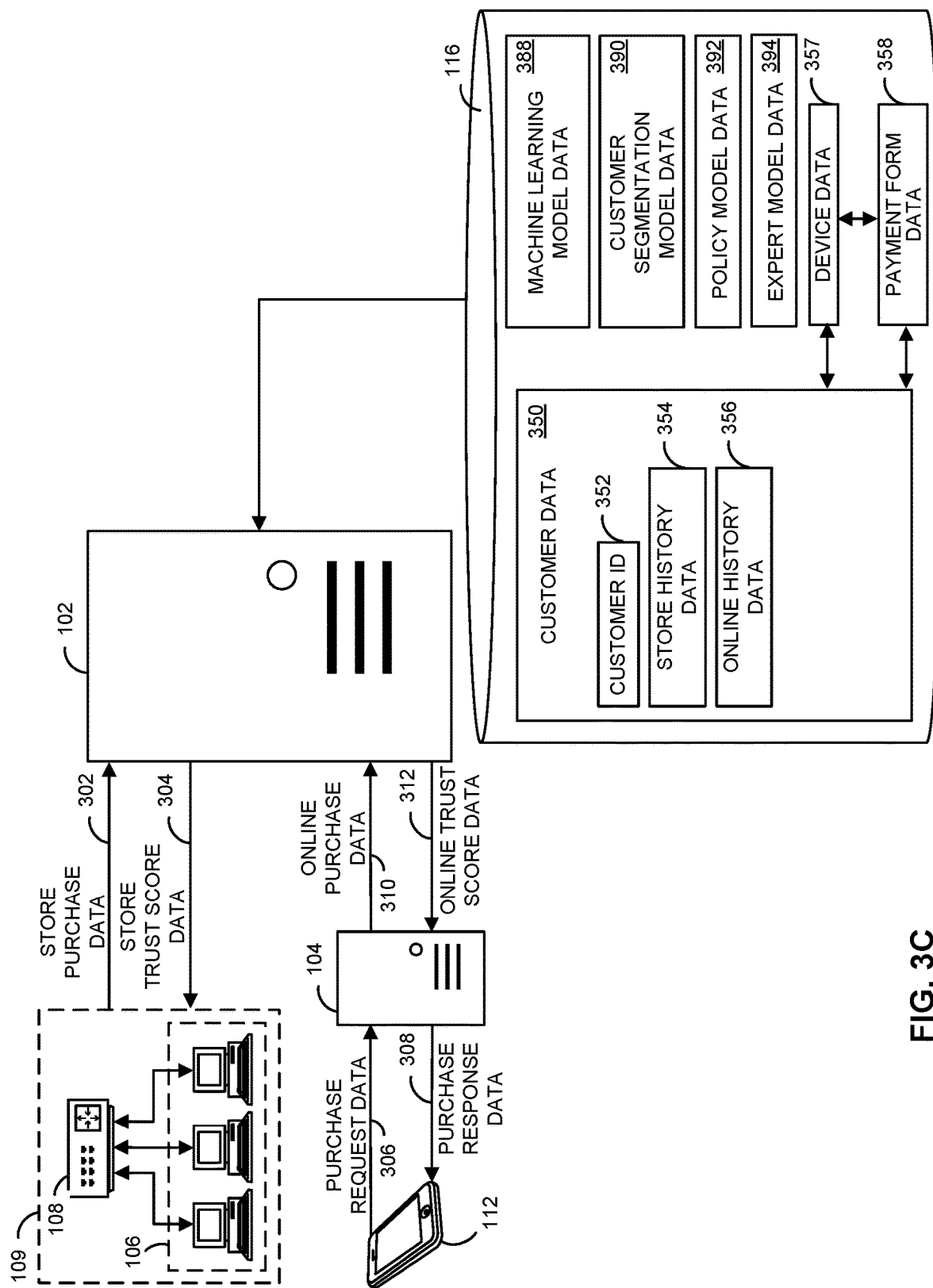

FIG. 3C is a block diagram illustrating examples of various portions of the fraud detection system of FIG. 1. In this example, database 116 stores machine learning model data 388, customer segmentation model data 390, policy model data 392, and expert model data 394.

Customer segmentation model data 390 may identify and characterize a customer segmentation model (e.g., algorithm) that segments customers based on one or more criteria. For example, the segmentation model may segment customers into new customers, active customers, and dormant customers.

Machine learning model data 388 may identify and characterize one or more machine learning models for each customer segment. For example, machine learning model data 388 may include a nonlinear classifier, and a linear classifier, for each customer segment. The nonlinear and linear classifiers may be in a stacked configuration. The machine learning models may be trained on customer data, such as customer data 350, and device data, such as device data 357.

Policy model data 392 and expert model data 394 may each identify and characterize one or more algorithms and rules. For example, policy model data 392 may include a rule prohibiting the sale of items to a geographical area (e.g., a country). Policy model data 392 may also include attribution rules. Attribution rules may be based on contracts with third party who have accepted to take liability for fraud chargebacks (e.g., a credit card company). An attribution rule may include, for example, a rule prohibiting the sale of items using a payment form with no attribution, or a rule prohibiting the sale of items where a fraud chargeback has occurred. Expert model data 394 may include risk specific rules. For example, expert model data 394 may include a rule that no more than $1000 may be purchased across three or more transactions in a given 24 hour period. Expert model data 394 may also include rules based on fraud trends (e.g., recent fraud trends). For example, expert model data 394 may include a rule that two brands of similar items, such as gaming consoles, cannot be purchased by the same customer with a threshold number of days. Expert model data 394 may further include rules configured by retailers, such as rules based on agent feedback on customer behavior. For example, one rule may be based on negative feedback received for a customer. The rule may indicate that if a customer receives a threshold number of negative feedbacks from a retailer's agent, the customer is to be prevented from making further purchases within a period of time.

When either store purchase data 302 or online purchase data 310 is received, fraud detection computing device 102 may determine a segment for a customer identified therein based on the customer segmentation model. For example, fraud detection computing device 102 may determine a customer ID based on store purchase data 302 or online purchase data 310, obtain customer data 350 for the customer based on the customer ID, and apply the customer segmentation model to the obtained customer data 350 to determine the segment for the customer.

Further, fraud detection computing device 102 may further obtain from database 116 device data 357 for a device identified by store purchase data 302 or online purchase data 310, and may generate features based on the customer data 350 and device data 357. In some examples, fraud detection computing device 102 generates features based on the information contained within store purchase data 302 or online purchase data 310.

Fraud detection computing device 102 may then apply the one or more machine learning models (e.g., as identified by machine learning model data 388) for the determined segment to one or more of the generated features to generate a first score. In some examples, the first score may be indicative of a probability value.

Further, fraud detection computing device 102 may apply the policy model to the customer data 350 to generate a second score. In addition, fraud detection computing device 102 may apply the expert model to the customer data 350 to generate a third score. In some examples, each of the second score and the third score is indicative of a number of rules satisfied, or not satisfied. In some examples, the policy model applied is based on the customer segment. Likewise, in some examples, the expert model applied is based on the customer segment.

Fraud detection computing device 102 may then generate the trust score based on the first score, the second score, and the third score. In some examples, if either the second score or the third score indicate that a rule has been satisfied (e.g., violated), the generated trust score is indicative of a fraudulent transaction, such as to prevent the transaction, regardless of the first score. In some examples, each of the first score, the second score, and the third score are combined and compared to a predetermined threshold. If the result is at or above the threshold, a trust score is generated to indicate the transaction is not trustworthy. If the result is below the threshold, a trust score is generated to indicate the transaction is trustworthy. In some examples, an algorithm is applied to the first score, the second score, and the third score to generate the trust score. In some examples, the trust score is a binary value, where one value (e.g., 1) indicates that the transaction is fraudulent, and another value (e.g., 0) indicates that the transaction is not fraudulent.

In response to store purchase data 302, fraud detection computing device 102 may generate store trust score data 304 to include the trust score, and transmit store trust score data 304 to store 109. In response to online purchase data 310, fraud detection computing device 102 may generate online trust score data 312 to include the trust score, and transmit online trust score data 312 to web server 104.

Figure 4A:
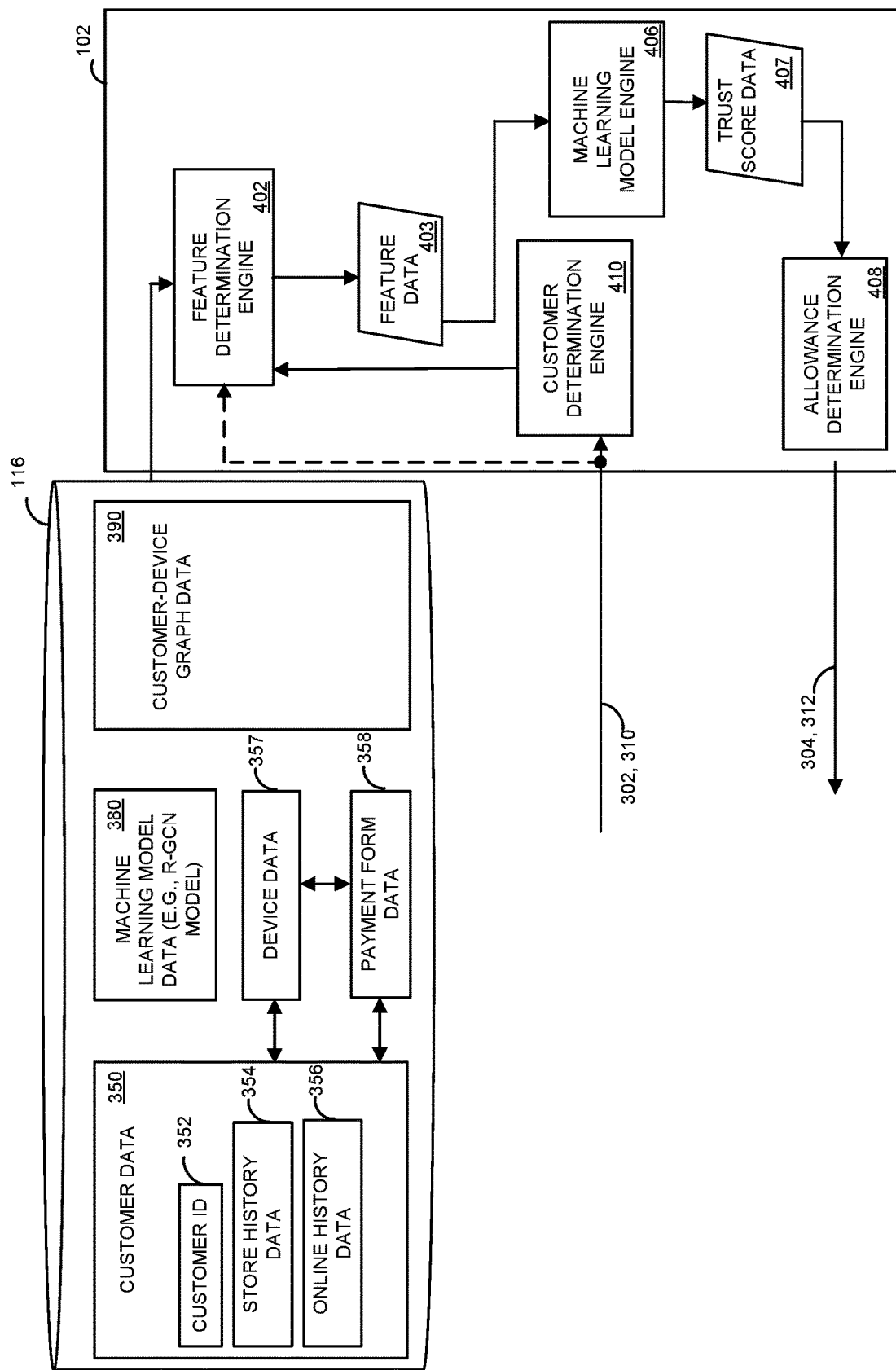
FIGS. 4A, 4B, and 4C are block diagrams illustrating examples of various portions of the fraud detection system of FIG. 1 in accordance with some embodiments.

FIG. 4A is a block diagram illustrating examples of various portions of the fraud detection computing device 102 of FIG. 1. As indicated in the figure, fraud detection computing device 102 includes feature determination engine 402, machine learning model engine 406, customer determination engine 410, and allowance determination engine 408. In some examples, one or more of feature determination engine 402, machine learning model engine 406, customer determination engine 410, and allowance determination engine 408 may be implemented in hardware. In some examples, one or more of feature determination engine 402, machine learning model engine 406, customer determination engine 410, and allowance determination engine 408 may be implemented as an executable program maintained in a tangible, non-transitory memory, such as instruction memory 207 of FIG. 2, which may be executed by one or processors, such as processor 201 of FIG. 2.

Customer determination engine 410 may receive a request, such as store purchase data 302 from store 109, or online purchase data 310 from web server 104. Customer determination engine 401 may determine, from the request, a customer and a device. For example, customer determination engine 401 may determine a customer ID of the customer, and a device ID of the device, based on the request. Customer determination engine 410 may provide the customer ID to feature determination engine 402.

Based on the customer ID, feature determination engine 402 may obtain, from database 116, customer data 350 for the customer, and, in some examples, device data 357 for the device. Feature determination engine 402 may generate features based on the customer data 350 and the device data 357. In some examples, may generate velocity based features or geospatial based features. In some examples, feature determination engine 402 generates features based on the information contained within the request (e.g., within store purchase data 302 and online purchase data 310). Feature determination engine 402 may pack the generated features within feature data 403, and transmit feature data 403 to machine learning model engine 406.

Machine learning model engine 406 may apply a trained machine learning process, such as the machine learning process described above with respect to FIG. 3A (e.g., machine learning model data 380), to feature data 403 to generate a trust score. Machine learning model engine 406 may pack the trust score within trust score data 407, and may transmit trust score data 407 to allowance determination engine 408. In some examples, machine learning model engine 406 stores trust score data 407 in database 116.

Allowance determination engine 408 receives the trust score data 407, and generates a response based on the trust score data 407. For example, allowance determination engine 408 may generate store trust score data 304 in response to store purchase data 302, where store trust score data 304 includes the generated trust score. In some examples, allowance determination engine 408 determines whether a transaction associated with the received request is to be allowed based on the trust score (e.g., based on a threshold as described herein), and includes data indicating the determination (e.g., allowed, or not allowed) within store trust score data 304. Allowance determination engine 408 transmits store trust score data 304 to store 109.

Similarly, allowance determination engine 408 may generate online trust score data 312 in response to online purchase data 310, where online trust score data 312 includes the generated trust score. In some examples, allowance determination engine 408 determines whether a transaction associated with the received request is to be allowed based on the trust score (e.g., based on a threshold as described herein), and includes data indicating the determination (e.g., allowed, or not allowed) within online trust score data 312. Allowance determination engine 408 transmits online trust score data 312 to web server 104.

Figure 4B:
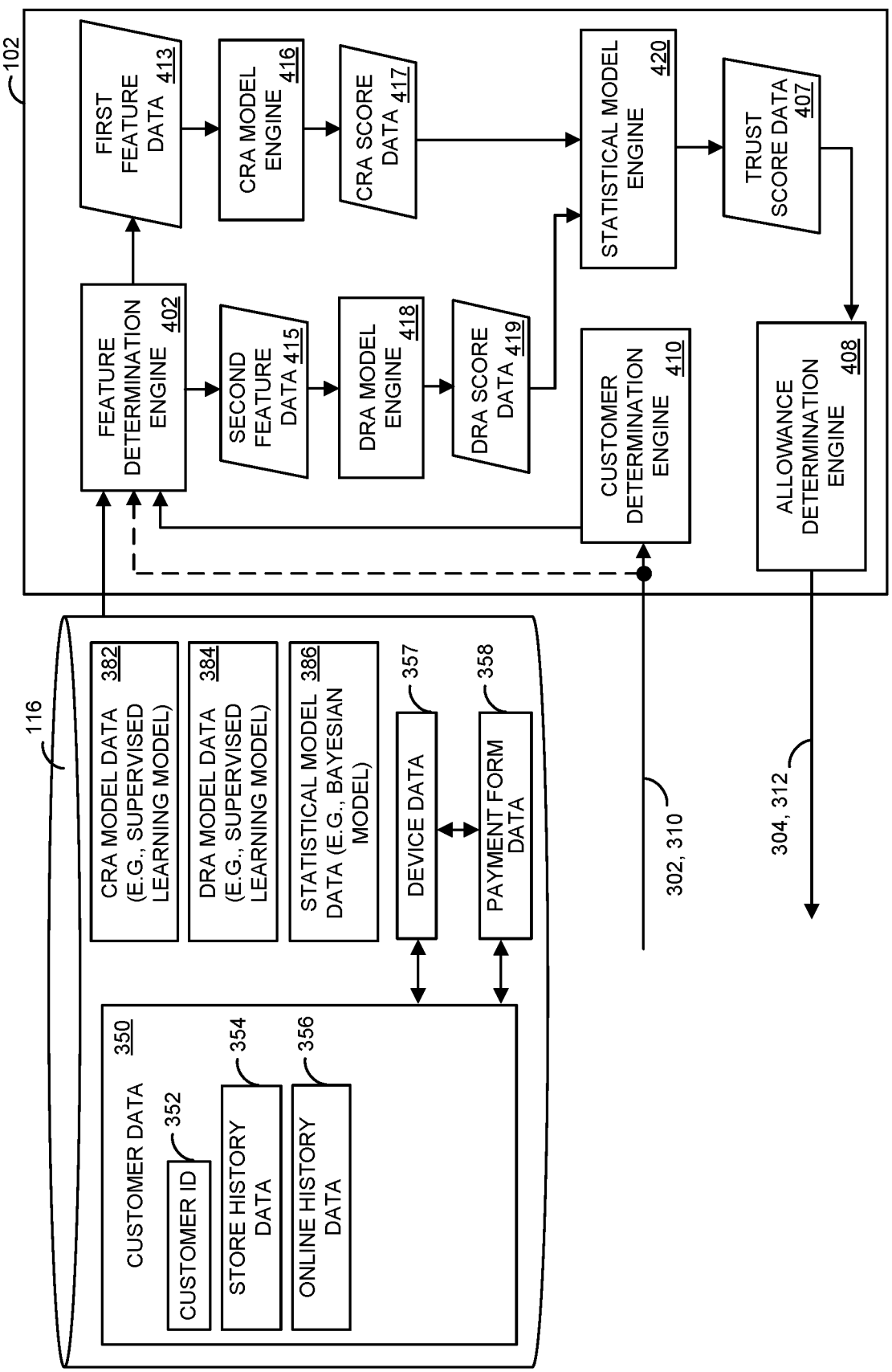

FIG. 4B is a block diagram illustrating examples of various portions of the fraud detection computing device 102 of FIG. 1. As indicated in the figure, fraud detection computing device 102 includes feature determination engine 402, customer determination engine 410, DRA model engine 418, CRA model engine 416, statistical model engine 420, and allowance determination engine 408. In some examples, one or more of feature determination engine 402, customer determination engine 410, DRA model engine 418, CRA model engine 416, statistical model engine 420, and allowance determination engine 408 may be implemented in hardware. In some examples, one or more of feature determination engine 402, customer determination engine 410, DRA model engine 418, CRA model engine 416, statistical model engine 420, and allowance determination engine 408 may be implemented as an executable program maintained in a tangible, non-transitory memory, such as instruction memory 207 of FIG. 2, which may be executed by one or processors, such as processor 201 of FIG. 2.

Customer determination engine 410 may receive a request, such as store purchase data 302 from store 109, or online purchase data 310 from web server 104. Customer determination engine 401 may determine, from the request, a customer and a device. For example, customer determination engine 401 may determine a customer ID of the customer, and a device ID of the device, based on the request. Customer determination engine 410 may provide the customer ID to feature determination engine 402.

Based on the customer ID, feature determination engine 402 may obtain, from database 116, customer data 350 for the customer, and, in some examples, device data 357 for the device. Feature determination engine 402 may generate features based on the customer data 350 and the device data 357. In some examples, may generate velocity based features or geospatial based features. In some examples, feature determination engine 402 generates features based on the information contained within the request (e.g., within store purchase data 302 and online purchase data 310).

Feature determination engine 402 may pack generated customer-based features within first feature data 413, and transmit first feature data 413 to CRA model engine 416. Feature determination engine 402 may also pack generated device-based features within second feature data 415, and transmit second feature data 415 to DRA model engine 418.

CRA model engine 416 may apply a CRA model, such as the CRA model described above with respect to FIG. 3B (e.g., CRA model data 382), to first feature data 413 to generate a CRA score. The CRA score may be a value indicative of the riskiness (e.g., chance that the transaction is fraudulent) of the transaction associated with the request coming from the customer. CRA model engine 416 may pack the CRA score within CRA score data 417, and transmit CRA score data 417 to statistical model engine 420.

Similarly, DRA model engine 418 may apply a DRA model, such as the DRA model described above with respect to FIG. 3B (e.g., DRA model data 384), to second feature data 415 to generate a DRA score. The DRA score may be a value indicative of the riskiness of the transaction associated with the request coming from the device. DRA model engine 418 may pack the DRA score within DRA score data 419, and transmit DRA score data 419 to statistical model engine 420.

Statistical model engine 420 may apply a statistical model, such as the statistical model described above with respect to FIG. 3C (e.g., statistical model data 386), to DRA score data 419 and CRA score data 417 to generate a trust score. For example, statistical model engine 420 may apply a trained Bayesian model to the CRA score and the DRA score (and, in some examples, additional features generated from customer data and device data) to generate the trust score. Statistical model engine 420 may pack the trust score into trust score data 407, and transmit trust score data 407 to allowance determination engine 408. In some examples, statistical model engine 420 stores trust score data 407 in database 116.

Allowance determination engine 408 receives the trust score data 407, and generates a response based on the trust score data 407. For example, allowance determination engine 408 may generate store trust score data 304 in response to store purchase data 302, where store trust score data 304 includes the generated trust score. In some examples, allowance determination engine 408 determines whether a transaction associated with the received request is to be allowed based on the trust score (e.g., based on a threshold as described herein), and includes data indicating the determination (e.g., allowed, or not allowed) within store trust score data 304. Allowance determination engine 408 transmits store trust score data 304 to store 109.

Similarly, allowance determination engine 408 may generate online trust score data 312 in response to online purchase data 310, where online trust score data 312 includes the generated trust score. In some examples, allowance determination engine 408 determines whether a transaction associated with the received request is to be allowed based on the trust score (e.g., based on a threshold as described herein), and includes data indicating the determination (e.g., allowed, or not allowed) within online trust score data 312. Allowance determination engine 408 transmits online trust score data 312 to web server 104.

Figure 4C:
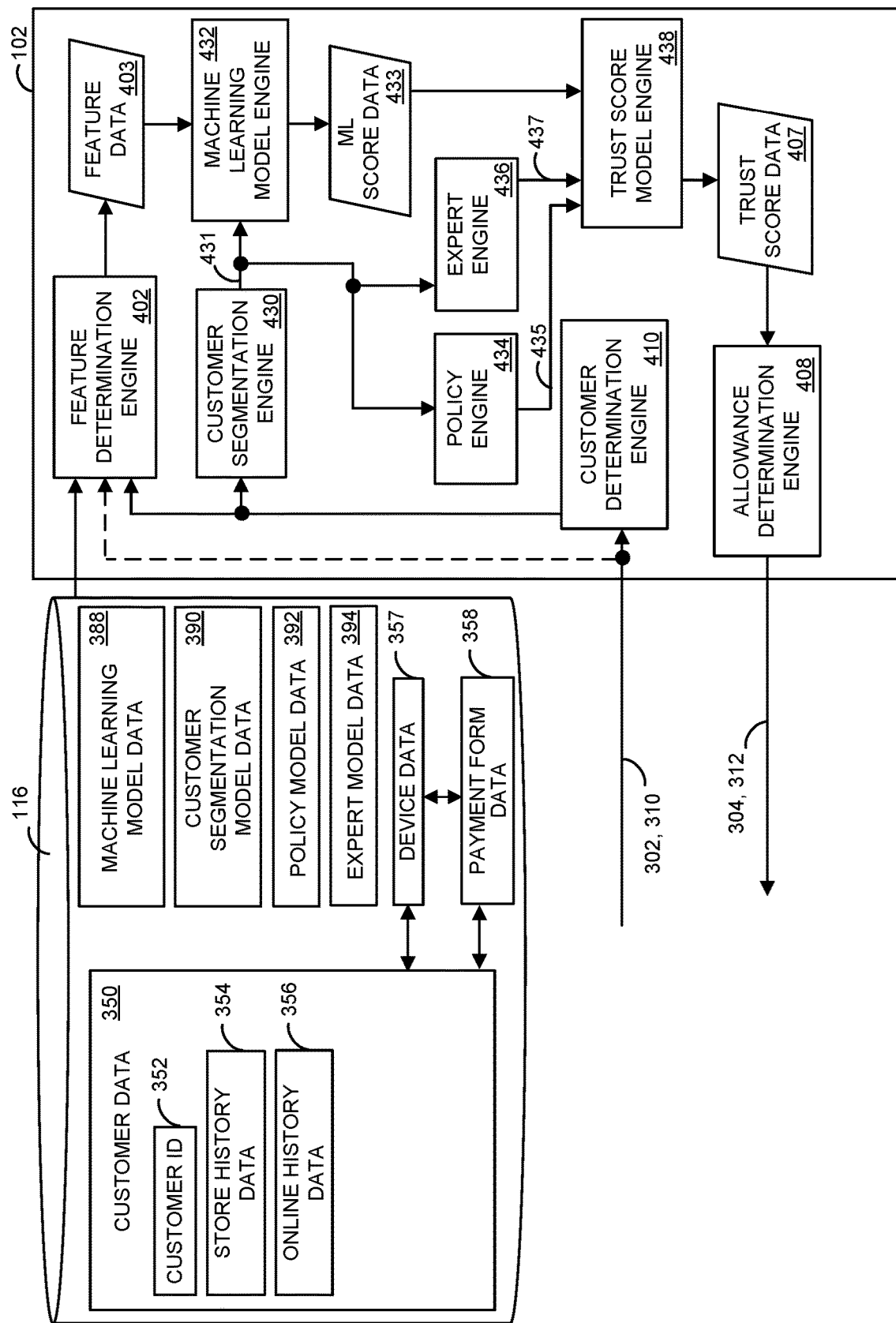

FIG. 4C is a block diagram illustrating examples of various portions of the fraud detection computing device 102 of FIG. 1. As indicated in the figure, fraud detection computing device 102 includes feature determination engine 402, customer determination engine 410, customer segmentation engine 430, machine learning model engine 432, trust score model engine 438, and allowance determination engine 408. In some examples, one or more of feature determination engine 402, customer determination engine 410, customer segmentation engine 430, machine learning model engine 432, trust score model engine 438, and allowance determination engine 408 may be implemented in hardware. In some examples, one or more of feature determination engine 402, customer determination engine 410, customer segmentation engine 430, machine learning model engine 432, trust score model engine 438, and allowance determination engine 408 may be implemented as an executable program maintained in a tangible, non-transitory memory, such as instruction memory 207 of FIG. 2, which may be executed by one or processors, such as processor 201 of FIG. 2.

Customer determination engine 410 may receive a request, such as store purchase data 302 from store 109, or online purchase data 310 from web server 104. Customer determination engine 401 may determine, from the request, a customer and a device. For example, customer determination engine 401 may determine a customer ID of the customer, and a device ID of the device, based on the request. Customer determination engine 410 may provide the customer ID to feature determination engine 402 and customer segmentation engine 430.

Customer segmentation engine 430 receives the customer ID from customer determination engine 410, obtains customer data 350 from database 116 for the corresponding customer ID, and applies a customer segmentation model to the obtained customer data 350 to determine a customer segment 431 for the customer. For example, customer segmentation engine 430 may apply the customer segmentation model described above with respect to FIG. 3C (e.g., customer segmentation model data 390) to the customer data 350 to determine the customer segment 431. Customer segmentation engine 430 transmits the customer segment 431 to feature determination engine 402, as well as to machine learning model engine 432, policy engine 434, and expert engine 436.

Based on the customer ID and the customer segment 431, feature determination engine 402 may obtain, from database 116, customer data 350 for the customer, and, in some examples, device data 357 for the device. For example, feature determination engine 402 may obtain customer data 350 and device data 357 for which to generate features for machine learning models (applied by machine learning model engine 432) corresponding to the customer segment 431. Feature determination engine 402 may generate the features based on the obtained customer data 350 and device data 357 including, in some examples, velocity based features and geospatial based features. In some examples, feature determination engine 402 generates features based on the information contained within the request (e.g., within store purchase data 302 and online purchase data 310). Feature determination engine 402 may pack the generated features within feature data 403, and transmit feature data 403 to machine learning model 432.

Machine learning model engine 432 may apply a trained machine learning process, such as the machine learning process described above with respect to FIG. 3C (e.g., machine learning model data 388), to feature data 403 to generate an ML score. The machine learning process may be, for example, a trained GBM model, a trained decision tree model, or a models under a stacked configuration, such as stacked nonlinear and linear classifiers. Machine learning model engine 406 may pack the ML score within ML score data 433, and may transmit ML score data 433 to trust score model engine 438.

In some examples, policy engine 434 receives customer segment 431, and obtains customer data 350 from database 116 for the corresponding customer. Policy engine 434 may then apply one or more algorithms to the obtained customer data 350 to generate a policy score 435. For example, policy engine 434 may apply a policy model, such as the policy model described above with respect to FIG. 3C (e.g., policy model data 392). The policy model may include one or more rules, where the policy score 435 indicate a violation of any of the rules. Policy engine 434 then transmits the policy score 435 to trust score model engine 438.

Similarly, in some examples, expert engine 436 receives customer segment 431, and obtains customer data 350 from database 116 for the corresponding customer. Expert engine 436 may then apply one or more algorithms to the obtained customer data 350 to generate an expert score 437. For example, expert engine 436 may apply an expert model, such as the expert model described above with respect to FIG. 3C (e.g., expert model data 394). The expert model may include one or more rules, where the expert score 437 indicate a violation of any of the rules. Expert engine 436 then transmits the engine score 437 to trust score model engine 438.

Trust score model engine 438 generates a trust score based on one or more of ML score data 433, policy score 435, and expert score 437. For example, trust score model engine 438 may combine the scores to generate the trust score. In some examples, the scores are combined (e.g., added) and compared to a predetermined threshold. If the result is at or above the threshold, the trust score is generated to indicate the transaction is fraudulent. If the result is below the threshold, the trust score is generated to indicate the transaction is trustworthy. In some examples, if either the policy score 435 or the expert score 437 indicate that a rule has been satisfied (e.g., violated), the trust score is generated to indicate a fraudulent transaction. In some examples, trust score model engine 438 applies an algorithm to the ML score, the policy score 435, and the expert score 437 to generate the trust score. In some examples, the trust score is a binary value, where one value (e.g., 1) indicates that the transaction is fraudulent, and another value (e.g., 0) indicates that the transaction is not fraudulent. Trust score model engine 438 packs the generated trust score within trust score data 407, and transmits trust score data 407 to allowance determination engine 408.

Allowance determination engine 408 receives the trust score data 407, and generates a response based on the trust score data 407. For example, allowance determination engine 408 may generate store trust score data 304 in response to store purchase data 302, where store trust score data 304 includes the generated trust score. In some examples, allowance determination engine 408 determines whether a transaction associated with the received request is to be allowed based on the trust score (e.g., based on a threshold as described herein), and includes data indicating the determination (e.g., allowed, or not allowed) within store trust score data 304. Allowance determination engine 408 transmits store trust score data 304 to store 109.

Similarly, allowance determination engine 408 may generate online trust score data 312 in response to online purchase data 310, where online trust score data 312 includes the generated trust score. In some examples, allowance determination engine 408 determines whether a transaction associated with the received request is to be allowed based on the trust score (e.g., based on a threshold as described herein), and includes data indicating the determination (e.g., allowed, or not allowed) within online trust score data 312. Allowance determination engine 408 transmits online trust score data 312 to web server 104.

Figure 6A:
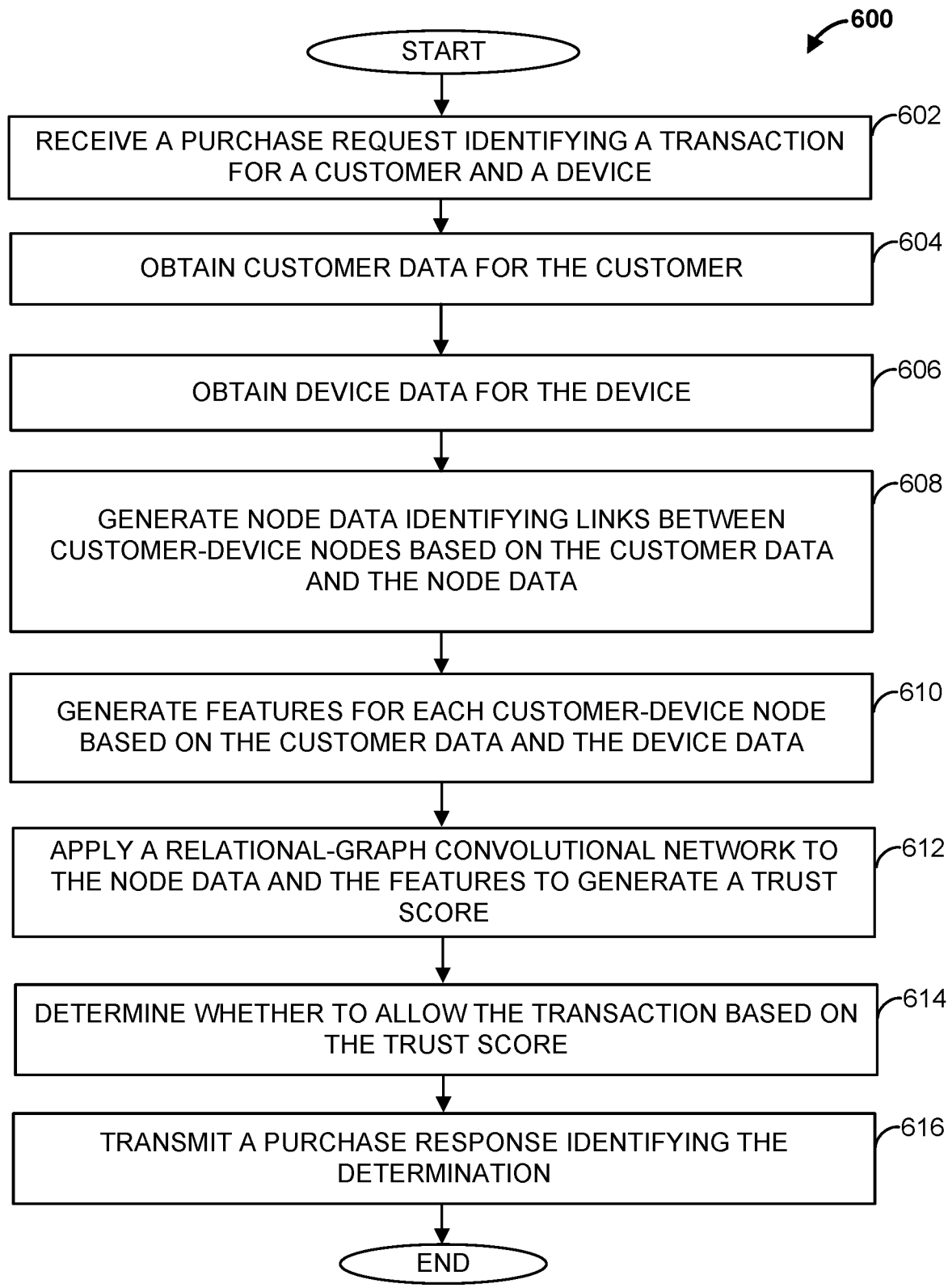
FIGS. 6A and 6B are flowcharts of example methods that can be carried out by the fraud detection system 100 of FIG. 1 in accordance with some embodiments.

FIG. 6A is a flowchart of an example method 600 that can be carried out by the fraud detection system 100 of FIG. 1. Beginning at step 602, a purchase request is received. The purchase request identifies a transaction for a customer and a device. For example, fraud detection computing device 102 may receive store purchase data 302 from store 109, or online purchase data 310 from web server 104. At step 604, customer data is obtained for the customer. For example, fraud detection computing device 102 may determine a customer ID based on the purchase request, and obtain customer data 350 from database 116 for the customer corresponding to the customer ID. At step 606, device data for the device is obtained. For example, fraud detection computing device 102 may determine a device ID based on the purchase request, and obtain device data 357 from database 116 for the device corresponding to the device ID.

Proceeding to step 608, node data is generated based on the customer data and the device data. The node data identifies links between customer-device nodes. For example, fraud detection computing device 102 may generate a customer-device graph, such as customer-device graph 550, that includes customer-device nodes (e.g., customer-device nodes 552A, 554A, 556A, 558A, 560A) and edges between the customer-device nodes (e.g., edges 572, 574, 576). The edges may be of a particular type based on a relation between the customer-device nodes. For example, the edges may be a common payment form link (e.g., same payment form for both nodes), a common device link (e.g., same device for both nodes), or a common customer link (e.g., same customer for both nodes).

At step 610, features are generated for each customer-device node based on corresponding customer data and device data. For example, fraud detection computing device 102 may determine customer data 350 and device data 357 corresponding to each customer-device node, and generate features based on the determined customer data 350 and device data 357 pertaining to each customer-device node.

At step 612, a relational-graph convolutional network (R-GCN) is applied to the node data and the features to generate a trust score. For example, fraud detection computing device 102 may generate a first matrix based on the node data (e.g., representing the customer-device nodes and edge types between nodes), and a second matrix based on the generated features for each customer-device node (e.g., feature matrix 503). Fraud detection computing device 102 may apply the R-GCN, such as R-GCN model 500, to the first matrix and the second matrix to generate the trust score (e.g., trust score data 407 with respect to FIG. 4A).

At step 614, a determination is made as to whether to allow the transaction based on the trust score. For example, fraud detection computing device 102 may compare the trust score to a predetermined threshold, and determine to allow the transaction if the trust score is at or above the threshold. Otherwise, if the trust score is below the threshold, fraud detection computing device 102 may determine to not allow the transaction.

At step 616, a purchase response is transmitted identifying the determination. For example, fraud detection computing device 102 may generate a first value if allowing the transaction (e.g., 1), and a second value if not allowing the transaction (e.g., 0). Fraud detection computing device 102 may include the value in the purchase response, and transmit the purchase response. For example, if responding to store purchase data 302, fraud detection computing device 102 may pack the value into store trust score data 304, and transmit store trust score data 304 to store 109. If responding to online purchase data 310, fraud detection computing device 102 may pack the value into online trust score data 312, and transmit online trust score data 312 to web server 104. In some examples, fraud detection computing device 102 stores the trust score in database 116. The method then ends.

Figure 6B:
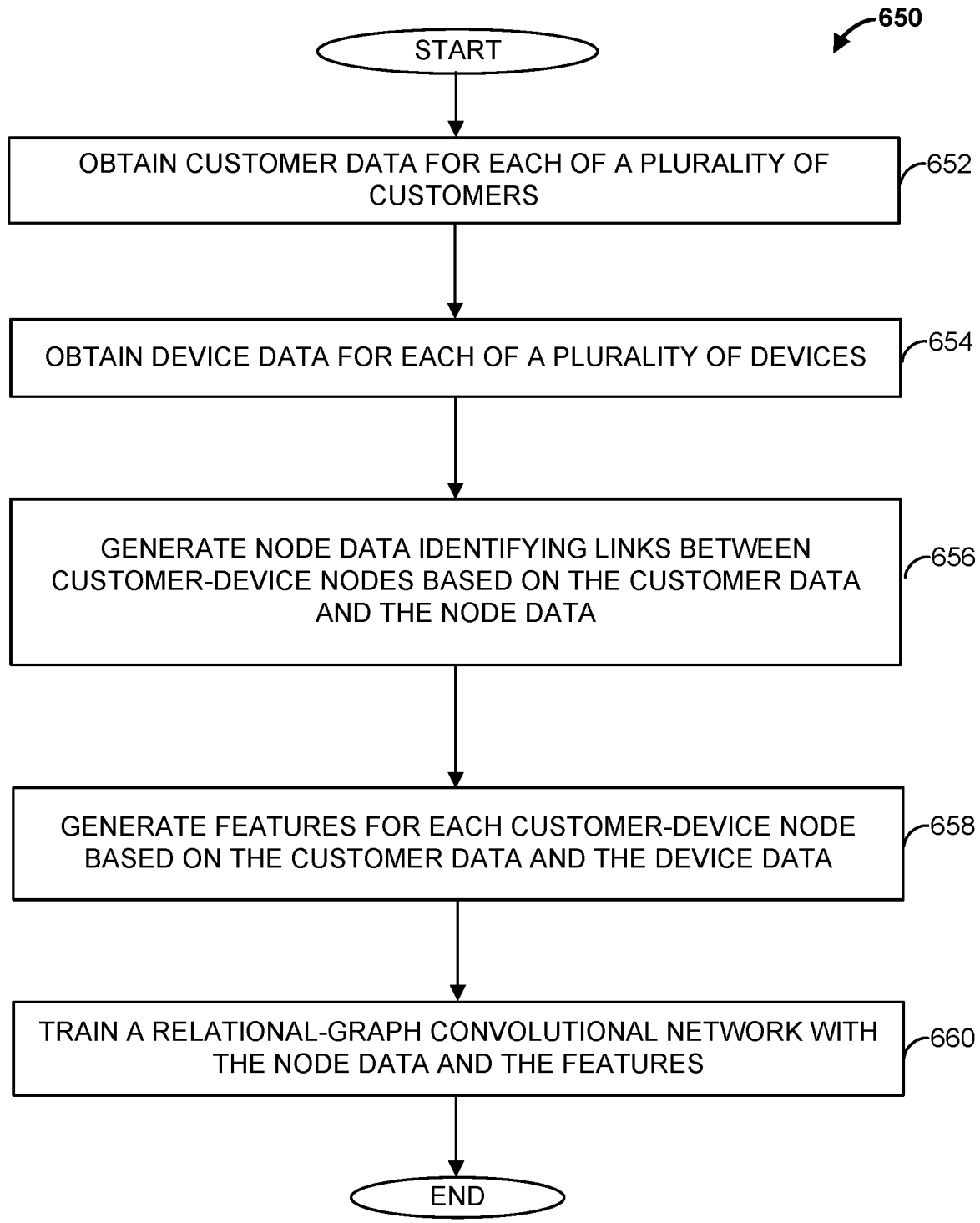

FIG. 6B is a flowchart of an example method 650 that can be carried out by the fraud detection system 100 of FIG. 1. Beginning at step 652, customer data is obtained for a plurality of customers. For example, fraud detection computing device 102 may obtain, from database 116, customer data 350 for each of the plurality of customers. At step 654, device data is obtained for each of a plurality of devices. For example, fraud detection computing device 102 may obtain, from database 116, device data 357 for each of the plurality of devices.

Proceeding to step 654, node data is generated based on the customer data and the device data. The node data identifies links between customer-device nodes. For example, fraud detection computing device 102 may generate a customer-device graph, such as customer-device graph 550, that includes customer-device nodes (e.g., customer-device nodes 552A, 554A, 556A, 558A, 560A) and edges between the customer-device nodes (e.g., edges 572, 574, 576). The edges may be of a particular type based on a relation between the customer-device nodes. For example, the edges may be a common payment form link (e.g., same payment form for both nodes), a common device link (e.g., same device for both nodes), or a common customer link (e.g., same customer for both nodes).

At step 656, features are generated for each customer-device node based on corresponding customer data and device data. For example, fraud detection computing device 102 may determine customer data 350 and device data 357 corresponding to each customer-device node, and generate features based on the determined customer data 350 and device data 357 pertaining to each customer-device node.

At step 658, a relational-graph convolutional network (R-GCN) is trained with the node data and the generated features. For example, fraud detection computing device 102 may generate a first matrix based on the node data (e.g., representing the customer-device nodes and edge types between nodes), and a second matrix based on the generated features for each customer-device node (e.g., feature matrix 503). Fraud detection computing device 102 may train the R-GCN, such as R-GCN model 500, with the first matrix and the second matrix. In some examples, fraud detection computing device 102 may store the trained R-GCN model in database 116. The method then ends.

Figure 7:
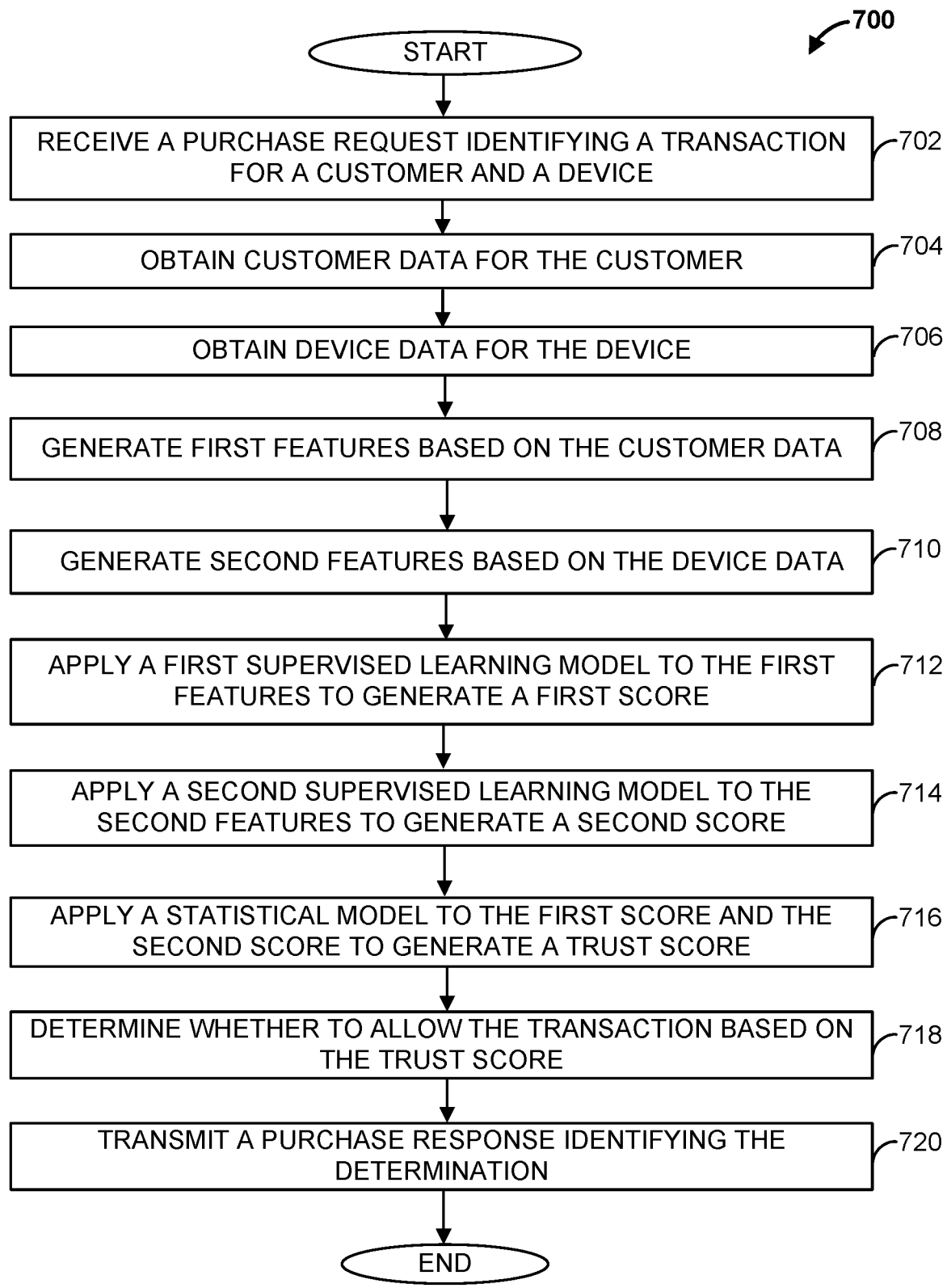
FIG. 7 is a flowchart of another example method that can be carried out by the fraud detection system 100 of FIG. 1 in accordance with some embodiments.

FIG. 7 is a flowchart of an example method 700 that can be carried out by the fraud detection system 100 of FIG. 1. Beginning at step 702, a purchase request is received. The purchase request identifies a transaction for a customer and a device. For example, fraud detection computing device 102 may receive store purchase data 302 from store 109, or online purchase data 310 from web server 104. At step 704, customer data is obtained for the customer. For example, fraud detection computing device 102 may determine a customer ID based on the purchase request, and obtain customer data 350 from database 116 for the customer corresponding to the customer ID. At step 706, device data for the device is obtained. For example, fraud detection computing device 102 may determine a device ID based on the purchase request, and obtain device data 357 from database 116 for the device corresponding to the device ID.

Proceeding to step 708, first features are generated based on the customer data. For example, fraud detection computing device 102 may generate first feature data 413 for a CRA model applied by CRA model engine 416, as described with respect to FIG. 4B. At step 710, second features are generated based on the device data. For example, fraud detection computing device 102 may generate second feature data 415 for a DRA model applied by DRA model engine 418, as described with respect to FIG. 4B.

At step 712, a first supervised learning model is applied to the first features to generate a first score. For example, fraud detection computing device 102 may apply the CRA model to first feature data 413 to generate the CRA score identified within CRA score data 417. The first supervised learning model may be a trained Bayesian model, for example. At step 714, a second supervised earning model is applied to the second features to generate a second score. For example, fraud detection computing device 102 may apply the DRA model to second feature data 415 to generate the DRA score identified within DRA score data 419. The second supervised learning model may be a trained Bayesian model, for example.

Proceeding to step 716, a statistical model is applied to the first score and the second score to generate a trust score. For example, fraud detection computing device 102 may apply the statistical model of statistical model engine 420 to CRA score data 417 and DRA score data 419 to generate the trust score.

At step 718, a determination is made as to whether to allow the transaction based on the trust score. For example, fraud detection computing device 102 may compare the trust score to a predetermined threshold, and determine to allow the transaction if the trust score is at or above the threshold. Otherwise, if the trust score is below the threshold, fraud detection computing device 102 may determine to not allow the transaction.

At step 720, a purchase response is transmitted identifying the determination. For example, fraud detection computing device 102 may generate a first value if allowing the transaction (e.g., 1), and a second value if not allowing the transaction (e.g., 0). Fraud detection computing device 102 may include the value in the purchase response, and transmit the purchase response. For example, if responding to store purchase data 302, fraud detection computing device 102 may pack the value into store trust score data 304, and transmit store trust score data 304 to store 109. If responding to online purchase data 310, fraud detection computing device 102 may pack the value into online trust score data 312, and transmit online trust score data 312 to web server 104. In some examples, fraud detection computing device 102 stores the trust score in database 116. The method then ends.

Figure 8:
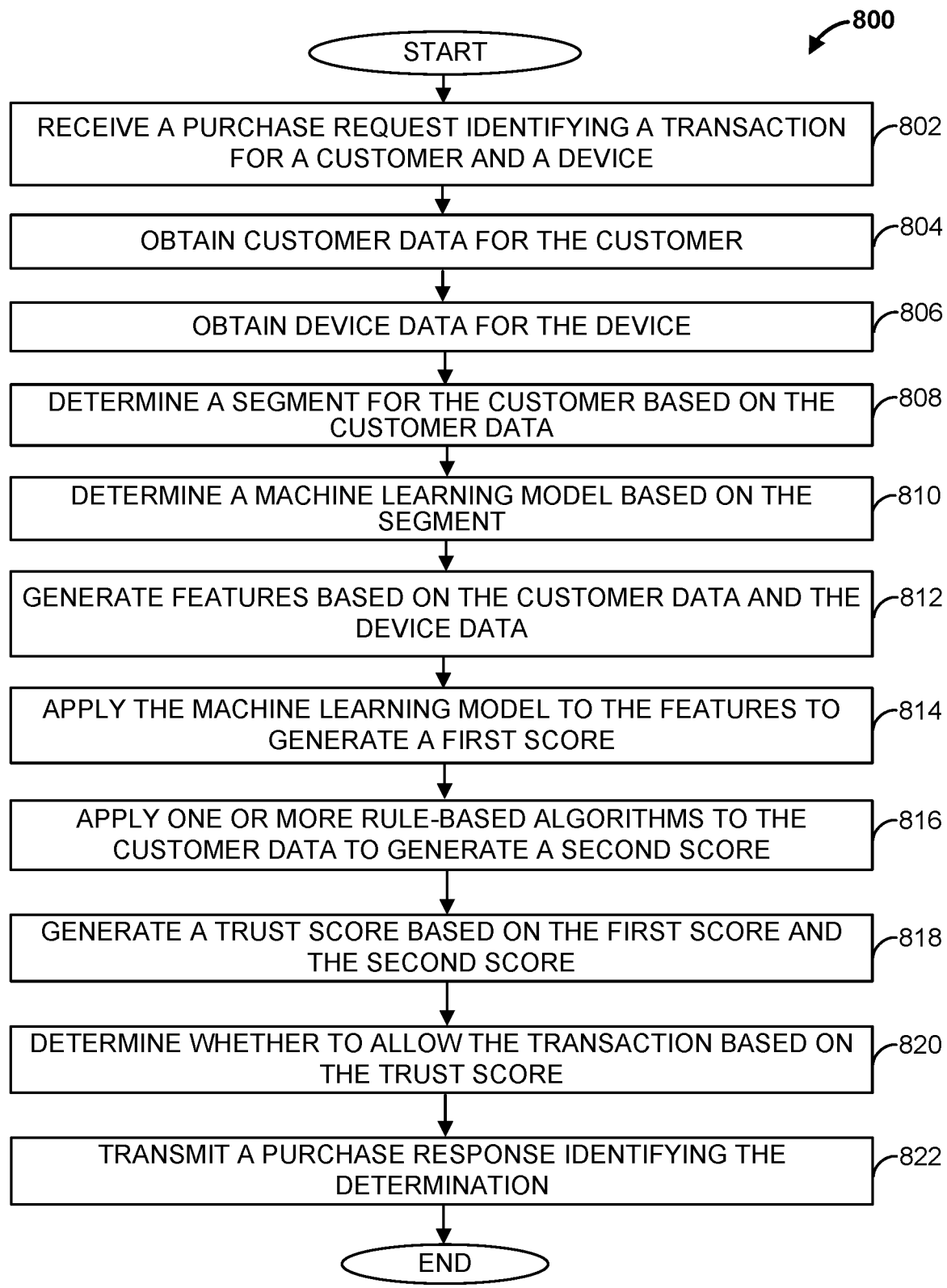
FIG. 8 is a flowchart of another example method that can be carried out by the fraud detection system 100 of FIG. 1 in accordance with some embodiments.

FIG. 8 is a flowchart of an example method 800 that can be carried out by the fraud detection system 100 of FIG. 1. Beginning at step 802, a purchase request is received. The purchase request identifies a transaction for a customer and a device. For example, fraud detection computing device 102 may receive store purchase data 302 from store 109, or online purchase data 310 from web server 104. At step 804, customer data is obtained for the customer. For example, fraud detection computing device 102 may determine a customer ID based on the purchase request, and obtain customer data 350 from database 116 for the customer corresponding to the customer ID. At step 806, device data for the device is obtained. For example, fraud detection computing device 102 may determine a device ID based on the purchase request, and obtain device data 357 from database 116 for the device corresponding to the device ID.

Proceeding to step 808, a segment is determined for the customer based on the customer data. For example, fraud detection computing device 102 may determine the segment based on a customer segmentation model, such as customer segmentation model applied by customer segmentation engine 430 of FIG. 4C. As an example, based on the customer data 350 for the customer, fraud detection computing device 102 may apply the customer segmentation model to determine whether the segment for the customer is a new customer segment, an active customer segment, or a dormant customer.

At step 810, a machine learning model is determined based on the segment. For example, fraud detection computing device 102 may determine at least one of a plurality of machine learning models identified by machine learning model data 388 and employed by the machine learning model engine 432 of FIG. 4C based on the determined segment. The machine learning model may be based on GBM, a decision tree, a non-linear classifier, or a linear classifier, for example.

At step 812, features are generated based on the customer data and the device data. The features are generated for the determined machine learning model. For example, fraud detection computing device 102 may generate feature data 403 for machine learning model engine 432. At step 814, the machine learning model is applied to the generated features to generate a first score. For example, machine learning model engine 432 may apply the determined machine learning model to feature data 403 to generate the ML score identified within ML score data 433.

At step 816, one or more rule-based algorithms are applied to the customer data to generate a second score. For example, policy engine 434 of FIG. 4C may apply a policy model (e.g., as identified by policy model data 392) to customer data to generate policy score 435. As another example, expert engine 436 of FIG. 4C may apply an expert model (e.g., as identified by expert model data 394) to customer data to generate expert score 437.

At step 818, a trust score is generated based on the first score and the second score. For example, trust score model engine 438 of FIG. 4C may determine, based on at least one of ML score data 433, policy score 434, and expert engine 436, the trust score. In some examples, the first score and the second score are combined to generate the trust score. In some examples, the first score and the second score are combined (e.g., added) and compared to a predetermined threshold. If the result is at or above the threshold, the trust score is generated to indicate the transaction is fraudulent. If the result is below the threshold, the trust score is generated to indicate the transaction is trustworthy.

At step 820, a determination is made as to whether to allow the transaction based on the trust score. For example, fraud detection computing device 102 may compare the trust score to a predetermined threshold, and determine to allow the transaction if the trust score is at or above the threshold. Otherwise, if the trust score is below the threshold, fraud detection computing device 102 may determine to not allow the transaction.

At step 822, a purchase response is transmitted identifying the determination. For example, fraud detection computing device 102 may generate a first value if allowing the transaction (e.g., 1), and a second value if not allowing the transaction (e.g., 0). Fraud detection computing device 102 may include the value in the purchase response, and transmit the purchase response. For example, if responding to store purchase data 302, fraud detection computing device 102 may pack the value into store trust score data 304, and transmit store trust score data 304 to store 109. If responding to online purchase data 310, fraud detection computing device 102 may pack the value into online trust score data 312, and transmit online trust score data 312 to web server 104. In some examples, fraud detection computing device 102 stores the trust score in database 116. The method then ends.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
    a computing device configured to:
        receive purchase data identifying a transaction by a customer using a first device;
        obtain customer data for the customer;
        obtain device data for the device;
        determine a segment of a plurality of segments for the customer based on the customer data, wherein each of the plurality of segments defines a respective customer category that is associated with a respective one of a plurality of machine learning models;
        determine a first feature set of a plurality of feature sets based on the segment;
        generate features in the first feature set based on the customer data and the device data;
        select a first machine learning model from the plurality of machine learning models based on the segment
        apply the first machine learning model to the features in the first feature set to generate a trust value;
        generate a purchase response based on the trust value; and
        transmit the purchase response to another computing device.

2. The system of claim 1, wherein the computing device is configured to:
    extract a customer identifier and a device identifier from the purchase data;
    obtain the customer data based on the customer identifier; and
    obtain the device data based on the device identifier.

3. The system of claim 1, wherein the purchase response indicates whether the transaction is fraudulent.

4. The system of claim 3, wherein the computing device is configured to compare the trust value to a predefined threshold, and generate the purchase response indicating that the transaction is fraudulent based on the comparison.

5. The system of claim 1, wherein the transmitted purchase response causes the another computing device to either allow, or disallow, the transaction.

6. The system of claim 1 wherein determining the segment of the plurality of segments for the customer comprises applying a segmentation model to the customer data.

7. The system of claim 1, wherein the first machine learning model is trained based on customer data and device data for a plurality of customers.

8. The system of claim 1, wherein applying the first machine learning model to the features in the first feature set generates a first score, and wherein the computing device is configured to apply one or more rules to the customer data to generate a second score, wherein generating the trust value is based on the first score and the second score.

9. The system of claim 8, wherein the second score indicates a violation of at least one of the one or more rules.

10. A method comprising:
    receiving purchase data identifying a transaction by a customer using a first device;
    obtaining customer data for the customer;
    obtaining device data for the device;
    determining a segment of a plurality of segments for the customer based on the customer data, wherein each of the plurality of segments defines a respective customer category that is associated with a respective one of a plurality of machine learning models;
    determining a first feature set of a plurality of feature sets based on the segment;
    generating features in the first feature set based on the customer data and the device data;
    selecting a first machine learning model from the plurality of machine learning models based on the segment;
    applying the first machine learning model to the features in the first feature set to generate a trust value;
    generating a purchase response based on the trust value; and
    transmitting the purchase response to another computing device.

11. The method of claim 10 comprising:
    extracting a customer identifier and a device identifier from the purchase data;
    obtaining the customer data based on the customer identifier; and
    obtaining the device data based on the device identifier.

12. The method of claim 10 comprising comparing the trust value to a predefined threshold, and generating the purchase response indicating whether the transaction is fraudulent based on the comparison.

13. The method of claim 10 wherein determining the segment of the plurality of segments for the customer comprises applying a segmentation model to the customer data.

14. The method of claim 10 wherein applying the first machine learning model comprises:
    applying the first machine learning model to the features in the first feature set to generate a first score; and
    applying one or more rules to the customer data to generate a second score, wherein generating the trust value is based on the first score and the second score.

15. A non-transitory computer readable medium having instructions stored thereon, wherein the instructions, when executed by at least one processor, cause a device to perform operations comprising:
    receiving purchase data identifying a transaction by a customer using a first device;
    obtaining customer data for the customer;
    obtaining device data for the device;
    determining a segment of a plurality of segments for the customer based on the customer data, wherein each of the plurality of segments defines a respective customer category that is associated with a respective one of a plurality of machine learning models;
determining a first feature set of a plurality of feature sets based on the segment;
generating features in the first feature set based on the customer data and the device data;
selecting a first machine learning model from the plurality of machine learning models based on the segment;
applying the first machine learning model to the features in the first feature set to generate a trust value;
generating a purchase response based on the trust value; and
transmitting the purchase response to another computing device.

16. The non-transitory computer readable medium of claim 15 wherein the instructions, when executed by the at least one processor, causes the device to perform operations comprising:
extracting a customer identifier and a device identifier from the purchase data;
obtaining the customer data based on the customer identifier; and
obtaining the device data based on the device identifier.

17. The non-transitory computer readable medium of claim 15 wherein the instructions, when executed by the at least one processor, causes the device to perform operations comprising comparing the trust value to a predefined threshold, and generating the purchase response indicating whether the transaction is fraudulent based on the comparison.

18. The non-transitory computer readable medium of claim 15 wherein the instructions, when executed by the at least one processor, causes the device to determine the segment of the plurality of segments for the customer by applying a segmentation model to the customer data.

19. The non-transitory computer readable medium of claim 15 wherein the instructions, when executed by the at least one processor, causes the device to generate the trust value by:
applying the first machine learning model to the features in the first feature set to generate a first score;
applying one or more rules to the customer data to generate a second score; and
generate the trust value based on the first score and the second score.

* * * * *